United States Patent
Armstrong et al.

(10) Patent No.: US 12,168,205 B2
(45) Date of Patent: Dec. 17, 2024

(54) APPARATUS AND METHOD FOR PREPARING INGREDIENTS FOR A BABY BOTTLE USING A CONCENTRATED SOLUTION

(71) Applicant: THE BABY BARISTA COMPANY, Granada Hills, CA (US)

(72) Inventors: Cara Armstrong, Simi Valley, CA (US); Robin Richards, Calabasas, CA (US); Richard Nanula, Malibu, CA (US); Ravi Sawhney, Malibu, CA (US); Lance Hussey, Thousand Oaks, CA (US); John Elam, Los Angeles, CA (US); Harnish Jani, Thousand Oaks, CA (US); Alexander Gilbert, McLean, VA (US); Derek Wong, Stevenson Ranch, CA (US); Jonathan Gjemso, Northridge, CA (US); Michael Schuffert, Chatsworth, CA (US); Scott Clear, Escondido, CA (US); Stephen Miczak, Las Vegas, NV (US)

(73) Assignee: THE BABY BARISTA COMPANY, Granada Hills, CA (US)

( * ) Notice: Subject to any disclaimer, the term of this patent is extended or adjusted under 35 U.S.C. 154(b) by 29 days.

(21) Appl. No.: 17/351,064

(22) Filed: Jun. 17, 2021

(65) Prior Publication Data

US 2022/0072487 A1    Mar. 10, 2022

Related U.S. Application Data

(63) Continuation of application No. 16/601,213, filed on Oct. 14, 2019, now Pat. No. 11,040,317, which is a
(Continued)

(51) Int. Cl.
*B01F 3/08* (2006.01)
*A47J 31/40* (2006.01)
(Continued)

(52) U.S. Cl.
CPC ........... *B01F 23/451* (2022.01); *A47J 31/401* (2013.01); *B01F 25/10* (2022.01); *B01F 25/72* (2022.01);
(Continued)

(58) Field of Classification Search
CPC ........ A47J 31/401; B01F 25/10; B01F 23/451
See application file for complete search history.

(56) References Cited

U.S. PATENT DOCUMENTS

| 4,015,749 | A | * | 4/1977 | Arzberger | ............. | A47J 31/401 222/640 |
| 7,863,546 | B2 | * | 1/2011 | Hestekin | .................. | A23L 2/00 99/279 |

(Continued)

*Primary Examiner* — Elizabeth Insler
(74) *Attorney, Agent, or Firm* — RISSO I.P.

(57) ABSTRACT

Described is an apparatus for preparing baby formula using a liquid concentrate solution. The apparatus includes a housing with a cavity for receiving and holding a container liquid concentrate solution. A motor is attached with the housing for forcing liquid concentrate solution from the container and into a mixing chamber. A pump and a water tank are also included. A spray head is attached with the housing. The spray head includes a plurality of spray jets in fluid connection with the pump for receiving water from the water tank and dispensing water from the spray jets into the mixing chamber. Finally, the mixing chamber receives the liquid concentrate solution and water, such that when the water and the liquid concentrate solution are introduced into the mixing chamber, the water and liquid concentrate solution mix into a baby formula and are dispensed from an outlet in the mixing chamber.

16 Claims, 23 Drawing Sheets

Related U.S. Application Data continuation of application No. 15/143,523, filed on Apr. 30, 2016, now Pat. No. 10,464,026.

(60) Provisional application No. 62/274,678, filed on Jan. 4, 2016, provisional application No. 62/156,045, filed on May 1, 2015.

(51) Int. Cl.
| | | |
|---|---|---|
| *B01F 5/00* | (2006.01) | |
| *B01F 5/20* | (2006.01) | |
| *B01F 15/02* | (2006.01) | |
| *B01F 23/451* | (2022.01) | |
| *B01F 25/10* | (2022.01) | |
| *B01F 25/72* | (2022.01) | |
| *B01F 35/71* | (2022.01) | |
| *B01F 23/40* | (2022.01) | |

(52) U.S. Cl.
CPC ........ B01F 35/7131 (2022.01); *B01F 23/483* (2022.01)

(56) References Cited

U.S. PATENT DOCUMENTS

| | | | | |
|---|---|---|---|---|
| 2006/0115570 A1* | 6/2006 | Guerrero | ............. | B67D 1/0027 426/590 |
| 2006/0266225 A1* | 11/2006 | Hammad | ............ | A47J 31/0647 99/279 |
| 2007/0267441 A1* | 11/2007 | van Opstal | ............. | B67D 1/07 222/145.6 |

* cited by examiner

Water heater pre-heat time look-up table
(desired final temperatures between 74 degrees and 105 degrees)

Table 1

FIG. 19A

Water heater pre-heat time look-up table
(desired final temperatures between 106 degrees and 136 degrees)

Table 1

FIG. 19B

Target temperature adjustment look-up table

| Volume (oz) | Δ = User Desired Temp - Ambient Temp (°F) | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 2 | 0.00 | 8.45 | 11.29 | 12.73 | 13.57 | 14.06 | 14.33 | 14.43 | 14.42 | 14.31 | 14.13 | 13.88 | 13.59 | 13.24 | 12.86 | 12.45 | 12.01 | 11.54 | 11.05 | 10.53 | 10.00 | 9.45 | 8.88 | 8.30 | 7.71 | 7.10 |
| 3 | 0.00 | 7.16 | 10.10 | 11.62 | 12.54 | 13.10 | 13.43 | 13.60 | 13.64 | 13.59 | 13.46 | 13.27 | 13.02 | 12.73 | 12.39 | 12.03 | 11.63 | 11.20 | 10.75 | 10.28 | 9.79 | 9.28 | 8.75 | 8.21 | 7.66 | 7.09 |
| 4 | 0.00 | 5.86 | 8.87 | 10.46 | 11.44 | 12.05 | 12.44 | 12.65 | 12.75 | 12.74 | 12.66 | 12.51 | 12.31 | 12.06 | 11.77 | 11.44 | 11.09 | 10.70 | 10.29 | 9.86 | 9.40 | 8.93 | 8.44 | 7.94 | 7.41 | 6.88 |
| 5 | 0.00 | 4.57 | 7.62 | 9.25 | 10.26 | 10.91 | 11.33 | 11.59 | 11.72 | 11.75 | 11.70 | 11.59 | 11.42 | 11.21 | 10.95 | 10.66 | 10.34 | 9.99 | 9.61 | 9.21 | 8.79 | 8.35 | 7.89 | 7.42 | 6.93 | 6.42 |
| 6 | 0.00 | 3.27 | 6.33 | 7.97 | 8.99 | 9.67 | 10.11 | 10.38 | 10.54 | 10.59 | 10.57 | 10.48 | 10.33 | 10.14 | 9.91 | 9.64 | 9.34 | 9.01 | 8.66 | 8.29 | 7.89 | 7.47 | 7.04 | 6.59 | 6.13 | 5.65 |
| 7 | 0.00 | 2.09 | 5.01 | 6.63 | 7.64 | 8.31 | 8.75 | 9.02 | 9.18 | 9.23 | 9.22 | 9.13 | 9.00 | 8.81 | 8.59 | 8.33 | 8.04 | 7.73 | 7.39 | 7.02 | 6.64 | 6.23 | 5.81 | 5.38 | 4.93 | 4.46 |
| 8 | 0.00 | 1.60 | 3.65 | 5.22 | 6.19 | 6.82 | 7.23 | 7.48 | 7.61 | 7.65 | 7.62 | 7.52 | 7.37 | 7.18 | 6.95 | 6.68 | 6.38 | 6.06 | 5.71 | 5.34 | 4.95 | 4.55 | 4.12 | 3.68 | 3.23 | 2.77 |

Increase in Target Temperature (°F)

| Δ = User Desired Temp - Ambient Temp (°F) | | | | | | | | | | | | | | | | | | | | | | | | | |
|---|---|---|---|---|---|---|---|---|---|---|---|---|---|---|---|---|---|---|---|---|---|---|---|---|---|
| 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
| 6.48 | 5.85 | 5.21 | 4.56 | 3.90 | 3.23 | 2.56 | 1.87 | 1.18 | 0.49 | -0.22 | -0.93 | -1.64 | -2.36 | -3.09 | -3.82 | -4.55 | -5.29 | -6.04 | -6.79 | -7.54 | -8.30 | -9.06 | -9.82 | -10.59 |
| 6.50 | 5.91 | 5.31 | 4.69 | 4.07 | 3.44 | 2.79 | 2.15 | 1.49 | 0.83 | 0.16 | -0.52 | -1.20 | -1.89 | -2.59 | -3.29 | -3.99 | -4.70 | -5.42 | -6.14 | -6.86 | -7.59 | -8.32 | -9.05 | -9.79 |
| 6.33 | 5.78 | 5.21 | 4.63 | 4.04 | 3.44 | 2.83 | 2.21 | 1.59 | 0.96 | 0.32 | -0.33 | -0.98 | -1.64 | -2.30 | -2.97 | -3.64 | -4.32 | -5.01 | -5.70 | -6.39 | -7.09 | -7.79 | -8.50 | -9.21 |
| 5.91 | 5.38 | 4.84 | 4.29 | 3.73 | 3.16 | 2.58 | 2.00 | 1.40 | 0.80 | 0.19 | -0.42 | -1.05 | -1.68 | -2.31 | -2.95 | -3.60 | -4.25 | -4.91 | -5.57 | -6.24 | -6.91 | -7.58 | -8.26 | -8.95 |
| 5.16 | 4.65 | 4.14 | 3.61 | 3.07 | 2.53 | 1.97 | 1.41 | 0.84 | 0.26 | -0.32 | -0.92 | -1.52 | -2.12 | -2.73 | -3.35 | -3.97 | -4.60 | -5.24 | -5.87 | -6.52 | -7.17 | -7.82 | -8.48 | -9.14 |
| 3.98 | 3.49 | 2.99 | 2.48 | 1.96 | 1.43 | 0.89 | 0.34 | -0.21 | -0.78 | -1.35 | -1.92 | -2.51 | -3.10 | -3.70 | -4.30 | -4.90 | -5.52 | -6.14 | -6.76 | -7.39 | -8.02 | -8.65 | -9.29 | -9.94 |
| 2.29 | 1.80 | 1.30 | 0.78 | 0.26 | -0.26 | -0.80 | -1.35 | -1.90 | -2.46 | -3.03 | -3.61 | -4.19 | -4.77 | -5.37 | -5.96 | -6.57 | -7.18 | -7.79 | -8.41 | -9.03 | -9.66 | -10.29 | -10.93 | -11.56 |

Increase in Target Temperature (°F)

Table 2

FIG. 20

Look-up table for pump-times

| Desired Total Output (oz) | Formula Pump Dispense Time (s) | Water pump Dispense Time (s) | Formula Pump Wait Time (s) |
|---|---|---|---|
| 2 | 2.07 | 4.35 | 0.28 |
| 3 | 3.11 | 6.525 | 1.42 |
| 4 | 4.14 | 8.7 | 2.56 |
| 5 | 5.18 | 10.875 | 3.70 |
| 6 | 6.21 | 13.05 | 4.84 |
| 7 | 7.25 | 15.225 | 5.98 |
| 8 | 8.29 | 17.4 | 7.11 |

Table 3

FIG. 21

APPARATUS AND METHOD FOR PREPARING INGREDIENTS FOR A BABY BOTTLE USING A CONCENTRATED SOLUTION

CROSS-REFERENCE TO RELATED APPLICATIONS

This is a Continuation Application of U.S. Non-Provisional application Ser. No. 16/601,213, filed on Oct. 14, 2019, which is a Continuation Application of U.S. Non-Provisional application Ser. No. 15/143,523, filed on Apr. 30, 2016, which is a non-provisional application of U.S. Provisional Application Ser. No. 62/156,045, filed on May 1, 2015, and U.S. Provisional Application Ser. No. 62/274,678, filed on Jan. 4, 2016, the entirety of which are incorporated herein by reference.

BACKGROUND OF THE INVENTION

(1) Field of Invention

The present invention relates to an appliance that is used to prepare formula used to feed infants and, more particularly, to an apparatus for preparing baby formula using a concentrated solution.

(2) Description of Related Art

As an alternative or supplement to natural milk, infants are often fed baby formula using a common baby bottle. Baby formula is typically in a powder form that is mixed with water to generate the resultant baby formula solution. To automate the mixing process, a variety of infant formula makers have been devised. Prior art has largely focused on creating a device that can be housed in an infant's nursery. To this end, prior art has had to address methods to decrease the noise of operation so that it would not disturb a sleeping baby. Formula feeding an infant requires easy access to supplies like bottles, nipples, bottlebrushes, sterilizing containers and water. Bottles that have been used need to be washed in a timely fashion. Formula spoils and smells within one hour of preparation if not refrigerated. This makes it impractical to use an automatic infant formula maker outside of the kitchen.

Nevertheless, efforts have been made to address that need and, in doing so, prior art has been devised that mixes powder into a formula preparation. A problem with such powder-based solutions is that powder has a tendency to stick at certain points in such devices (creating bacteria centers). Further, mixing the powder often results in a froth or uneven mixing.

Thus, a continuing need exists for a new and improved apparatus for preparing ingredients for a baby bottle that addresses the deficiencies of the prior art by mixing a liquid concentrate solution with water.

SUMMARY OF INVENTION

Described is an apparatus for preparing baby formula using a liquid concentrate solution. The apparatus includes a housing with a concentrate solution receptor (e.g., cavity) for receiving and holding a container liquid concentrate solution. A motor is attached with the housing for forcing liquid concentrate solution from the container and into a mixing chamber. A pump and a water tank are also included, with the pump being fluid connection (e.g., via tubing, etc.) with the water tank. A spray head is also attached with the housing. The spray head includes a plurality of spray jets in fluid connection with the pump and/or water tank for receiving water from the water tank and dispensing water from the spray jets into the mixing chamber. Finally, the mixing chamber is included for receiving the liquid concentrate solution and water, such that when the water and the liquid concentrate solution are introduced into the mixing chamber, the water and liquid concentrate solution mix into a baby formula and are dispensed from an outlet in the mixing chamber.

In another aspect, the apparatus includes a spray head receptor affixed with the housing and in fluid connection with the pump, with the spray head being detachably attachable with the spray head receptor.

In another aspect, when the spray head is attached with the spray head receptor, a gap is formed between the spray head and the spray head receptor, such that when the spray head receptor receives water, the water is introduced into the gap and forced from the spray jets in the spray head and into the mixing chamber.

In yet another aspect, the spray head includes a hole formed therethrough, with a twist cam lock passing through the hole. Further, the spray head receptor includes a lock hole with cam channels formed therein, such that a user can selectively attach and detach the spray head from the spray head receptor using the twist cam lock.

In yet another aspect, the mixing chamber is detachably attachable with the spray head. For example, the spray head includes a plurality of protrusions and the mixing chamber includes a circumference with a cam-shaped ridge that passes around the circumference of the mixing chamber, such that when the mixing chamber is attached with the spray head, twisting the mixing chamber causes the cam-shaped ridge to engage with the plurality protrusions and push the mixing chamber away from the spray head.

Additionally, the spray head includes at least one magnet therein and the mixing chamber includes a top portion framed by a metal ring, such that a magnetic connection between the metal ring and at least one magnet allows for selective attachment of the mixing chamber with the spray head. Thus, twisting the mixing chamber causes the cam-shaped ridge to engage with the plurality protrusions and push the mixing chamber away from the spray head and, in doing so, break the magnetic connection between the metal ring and at least one magnet.

In another aspect, when a container of liquid concentrate solution is attached with the concentrate solution receptor, the motor engages with a gear pump to pump liquid concentrate solution from the container of liquid concentrate solution.

In another aspect, a cleansing spray jet formed in the spray head, such that when the concentrate dispenser passes through the spray head, water received from the water tank is directed from the cleansing spray jet onto the concentrate dispenser to clean the concentrate dispenser.

In yet another aspect, a pour centering pin is connected with the outlet of the mixing chamber.

In another aspect, at least one mesh strainer is connected with the outlet of the mixing chamber.

In yet another aspect, the apparatus includes a heater for heating the water; a first temperature sensor positioned for sensing water temperature within the water tank; a second temperature sensor positioned for sensing temperature of the heater; and a third temperature sensor positioned for sensing at least one of ambient air temperature and temperature of the liquid concentrate solution.

Additionally, the apparatus includes an input control adapted to allow a user to select a desired volume and baby formula temperature, such that upon receiving the desired volume and baby formula temperature, the apparatus activates the heater for a period of time to obtain the desired volume and baby formula temperature based on the water temperature within the tank, the temperature of the heater, and the temperature of at least one of ambient air temperature and temperature of the liquid concentrate solution.

In another aspect, a container of liquid concentrate solution is included. The container of liquid concentrate solution is a flexible pouch having a pouch portion for holding the liquid concentrate solution therein.

Further, a gear pump is in fluid connection with the pouch portion and a duck-bill valve is in fluid connection with the gear pump. The duck-bill valve is operable as the concentrate dispenser for dispensing liquid concentrate solution from the flexible pouch.

In another aspect, a one-way valve is in fluid communication with the gear pump and duck-bill valve, such that the one-way valve is downstream from the gear pump and upstream from the duck-bill valve.

Further, flexible pouch is sealed within a rigid shell, with the rigid shell and flexible pouch collectively forming a liquid concentrate solution vessel.

In yet another aspect, a handle is attached with the concentrate solution vessel, the handle being connected with the concentrate dispenser such that pulling the handle away from the concentrate solution vessel and twisting the handle opens a locked valve within the concentrate solution vessel and pivots the concentrate dispenser downward into a dispensing position.

Finally, the present invention also includes a method for forming and using the apparatus herein. For example, the method for using the apparatus comprises several acts to achieve the operations or procedures as described below.

BRIEF DESCRIPTION OF THE DRAWINGS

The objects, features and advantages of the present invention will be apparent from the following detailed descriptions of the various aspects of the invention in conjunction with reference to the following drawings, where:

FIG. 19A is a water heater pre-heat time look-up table, depicting values for a desired final temperature between 74 degrees and 105 degrees;

FIG. 19B is a water heater pre-heat time look-up table, depicting values for a desired final temperature between 106 degrees and 136 degrees;

FIG. 20 is a target temperature adjustment look-up table; and

FIG. 21 is a pump-time look-up table.

DETAILED DESCRIPTION

Figure 1:
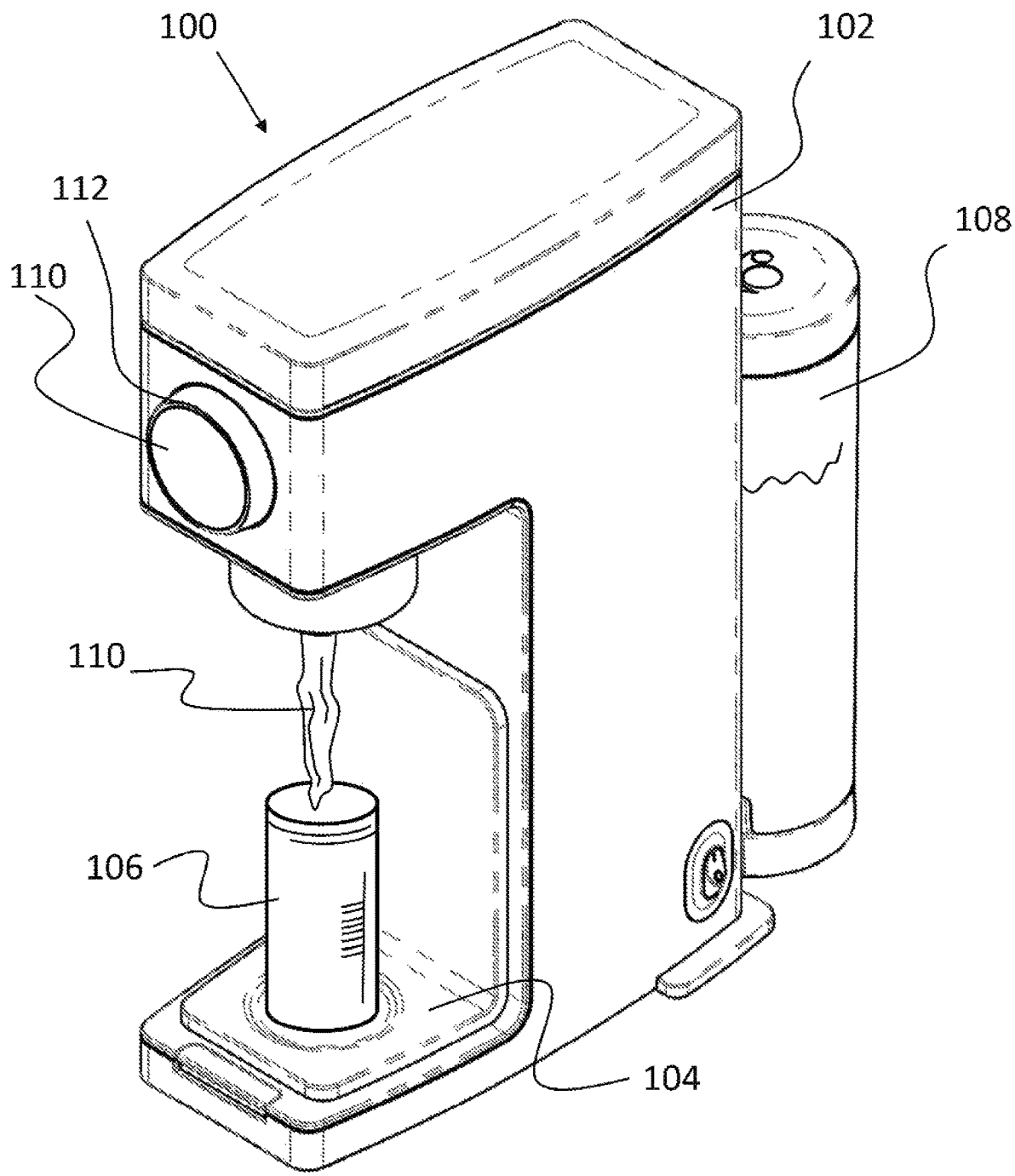
FIG. 1 is a front, three-quarter view illustration of an apparatus for preparing baby formula according to various embodiments of the present invention.
Figure 2:
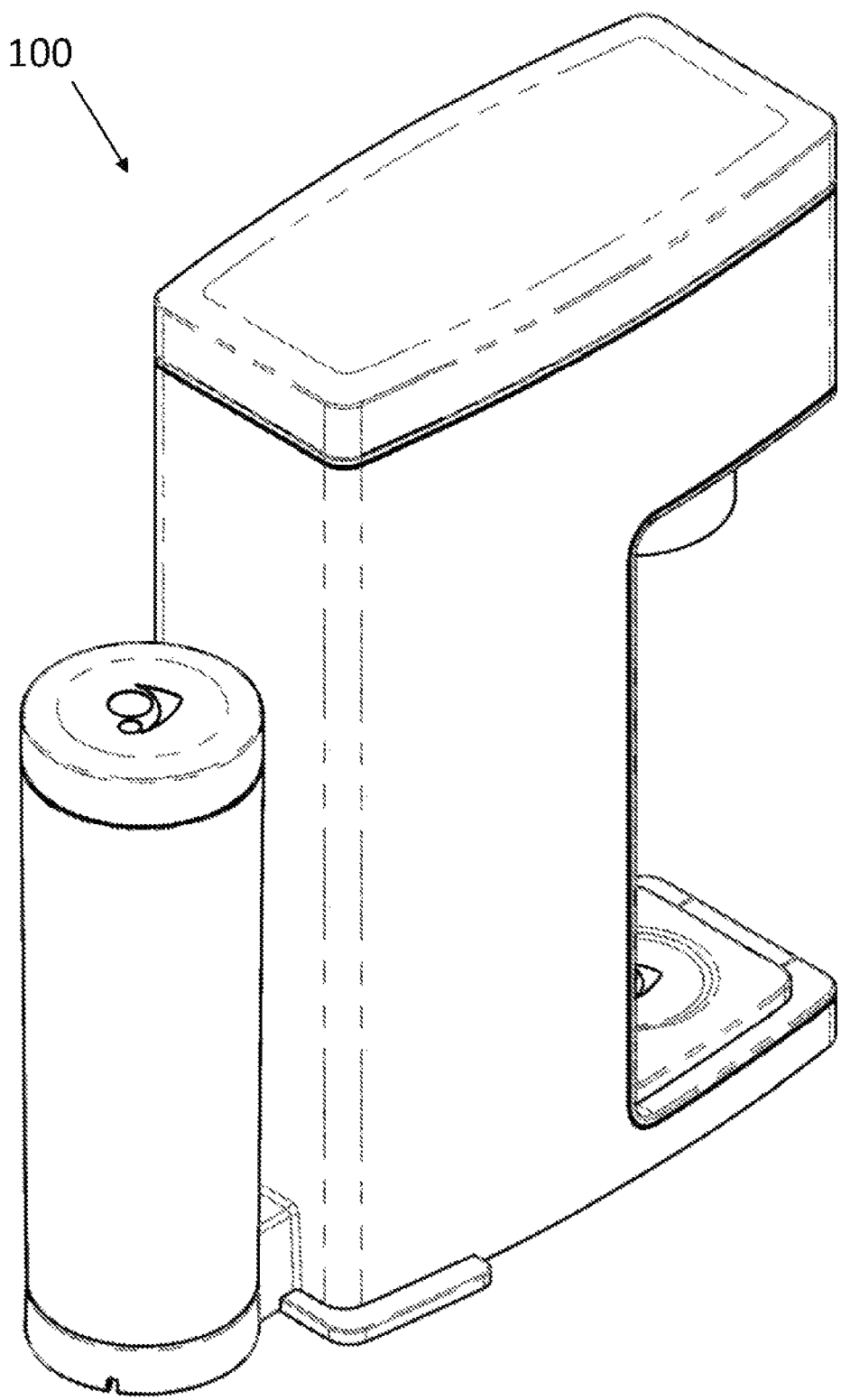
FIG. 2 is a rear, three-quarter view illustration of the apparatus for preparing baby formula.
Figure 3:
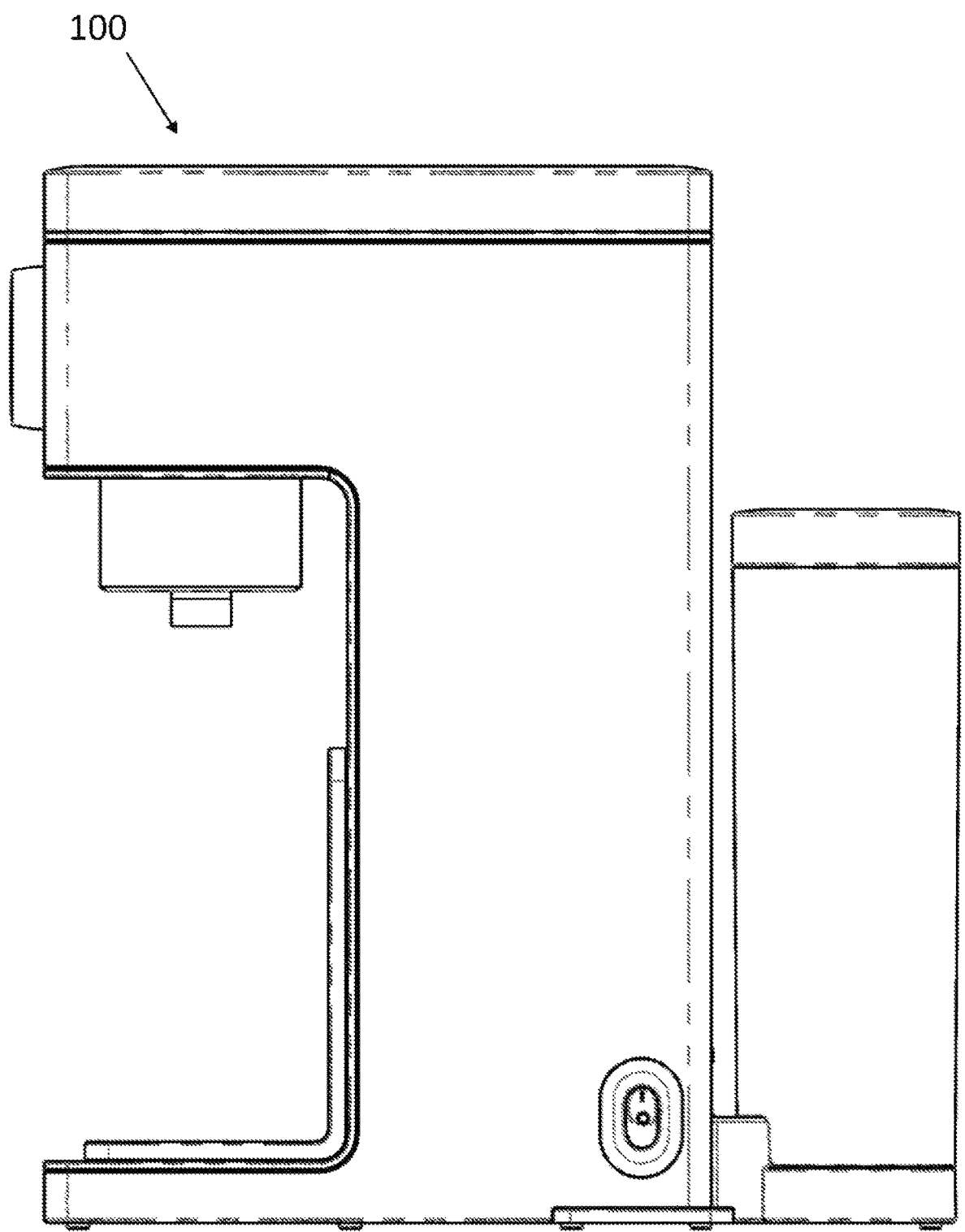
FIG. 3 is a right-view illustration of the apparatus for preparing baby formula.
Figure 4:
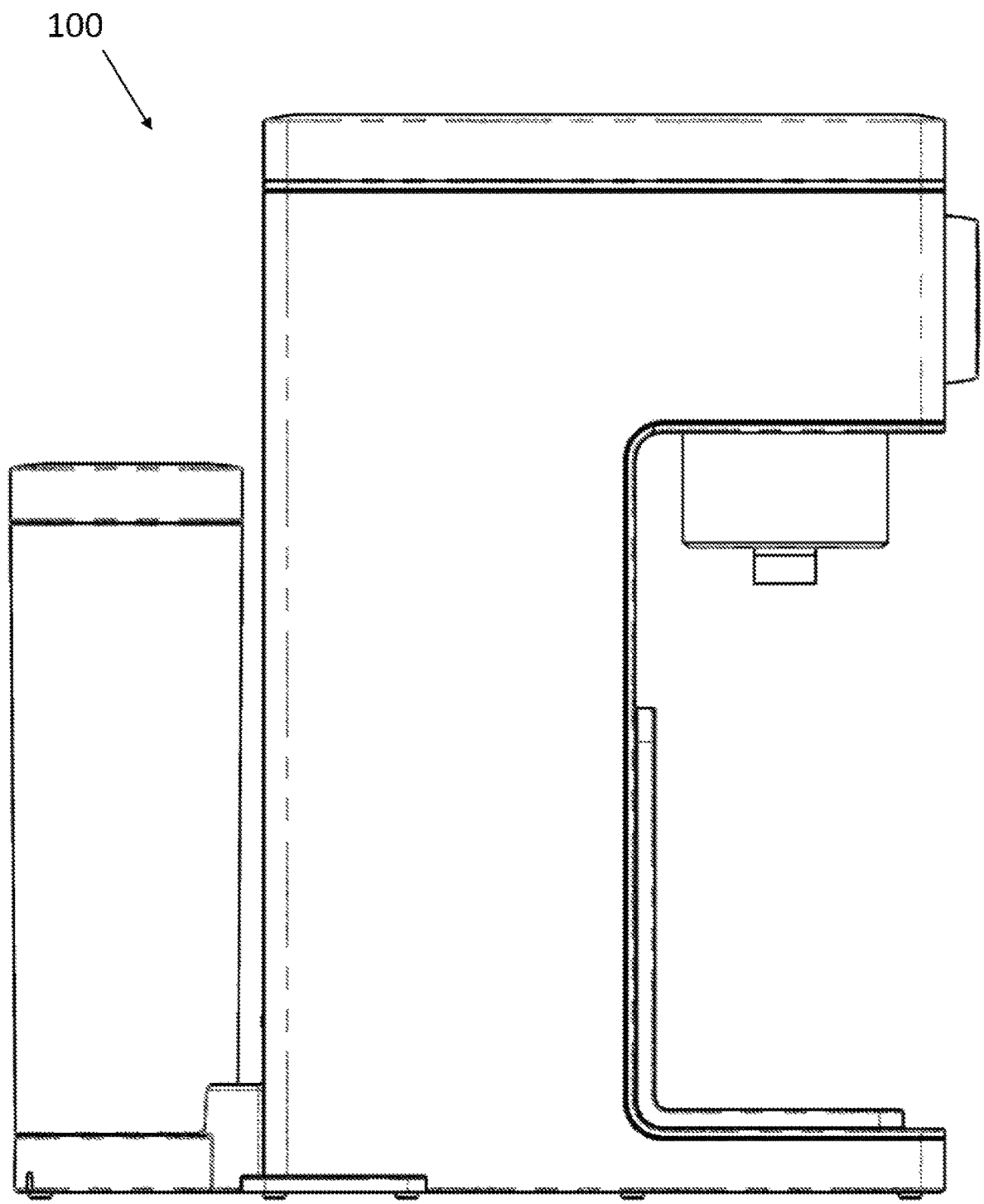
FIG. 4 is a left-view illustration of the apparatus for preparing baby formula.
Figure 5:
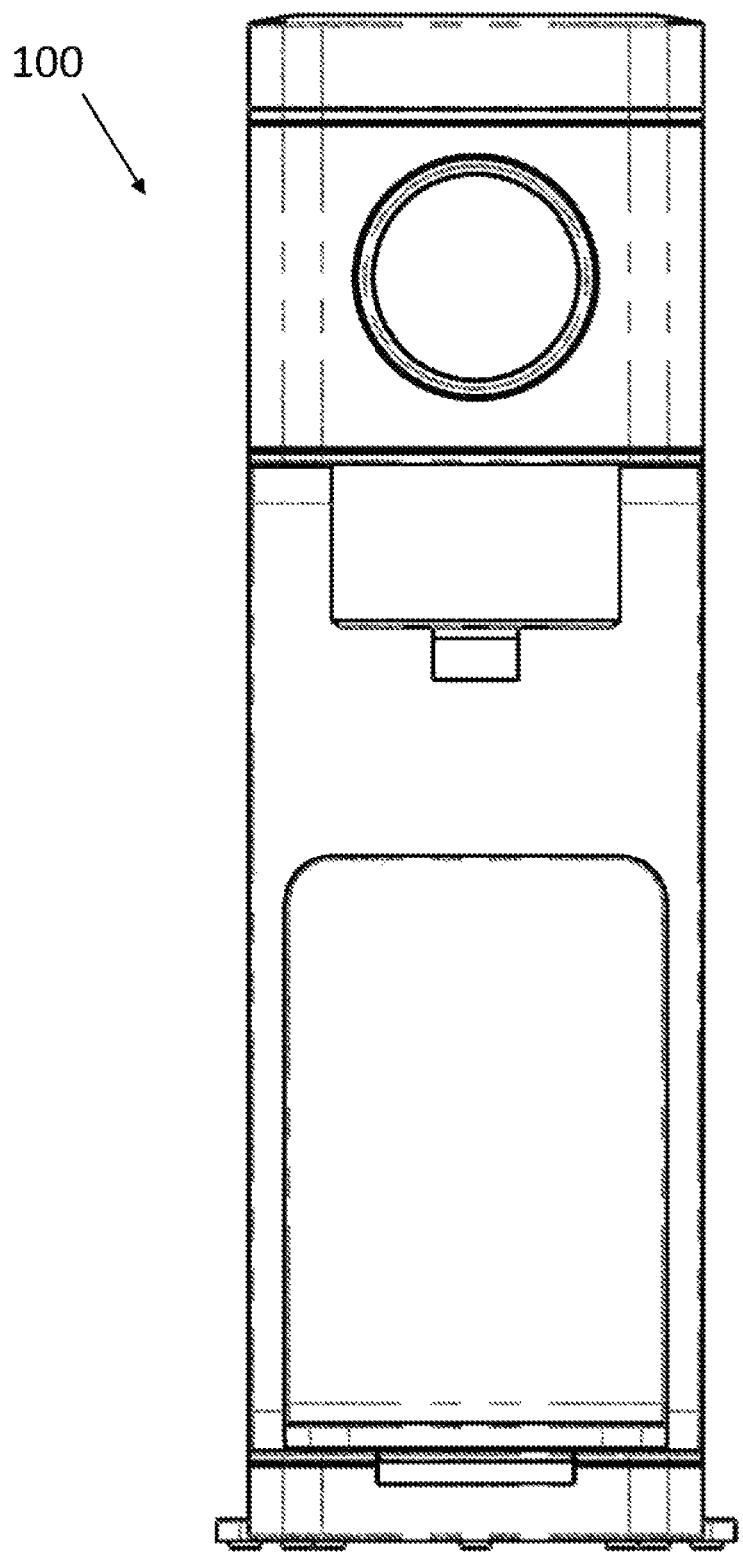
FIG. 5 is a front-view illustration of the apparatus for preparing baby formula.
Figure 6:
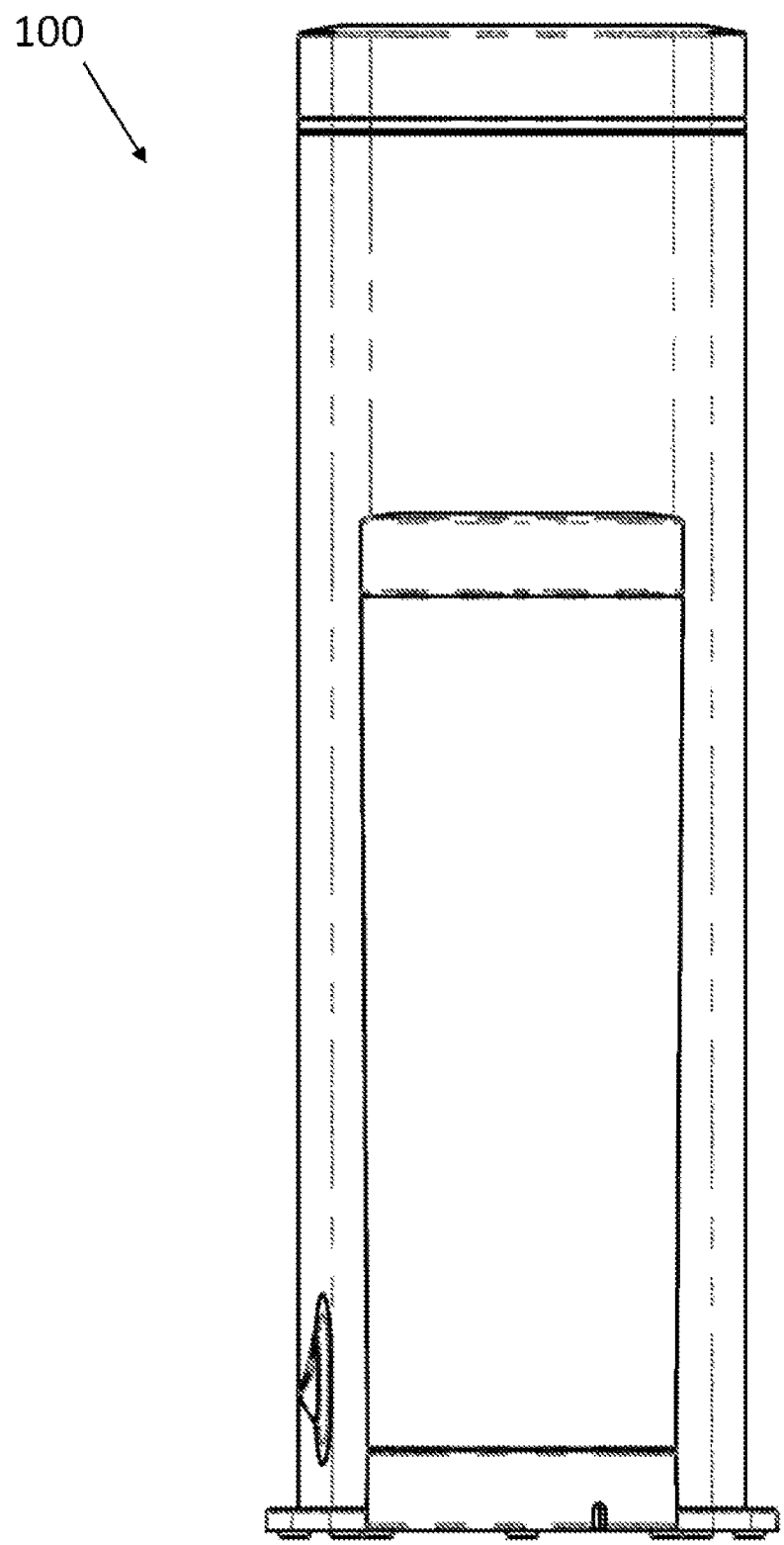
FIG. 6 is a rear-view illustration of the apparatus for preparing baby formula.
Figure 7:
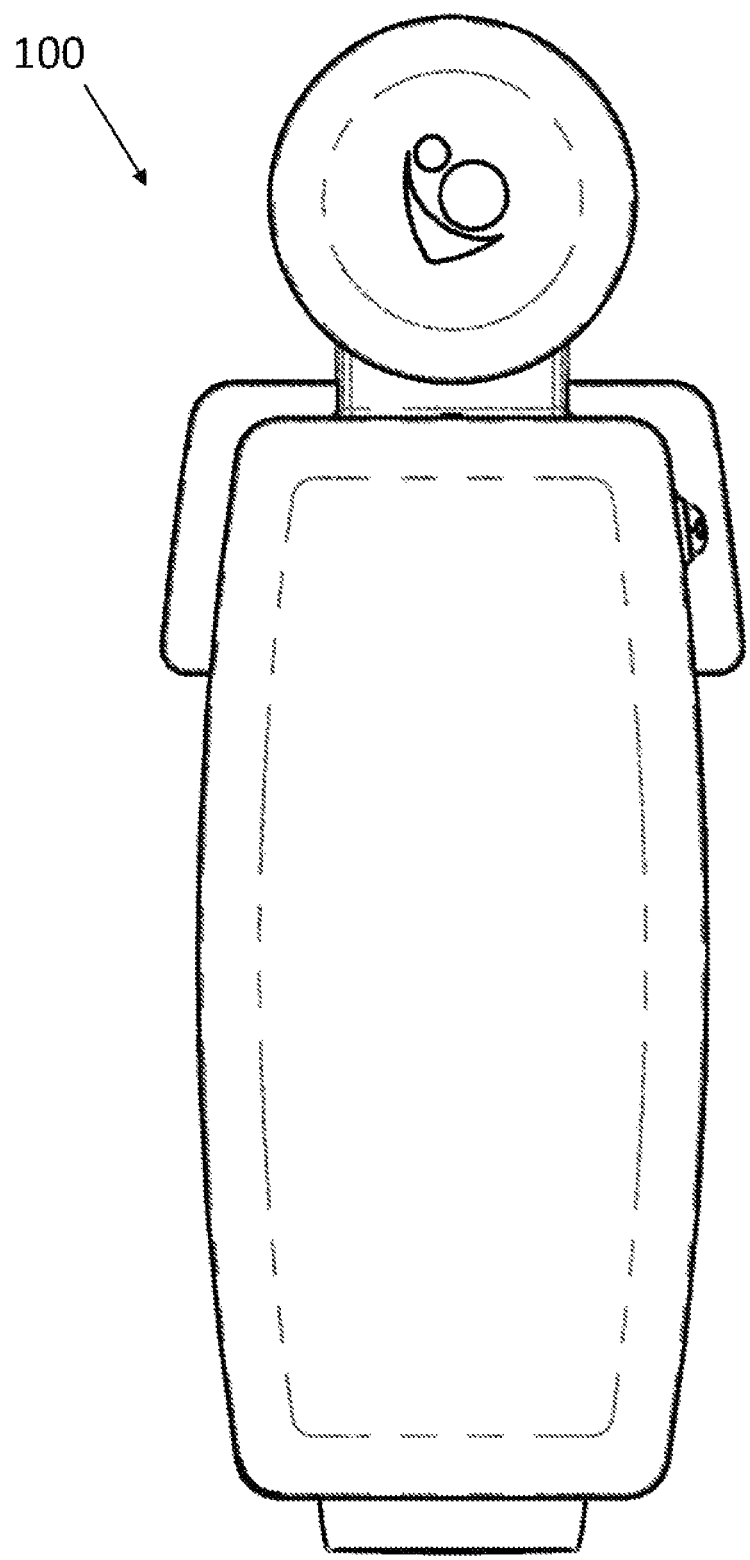
FIG. 7 is a top-view illustration of the apparatus for preparing baby formula.
Figure 8:
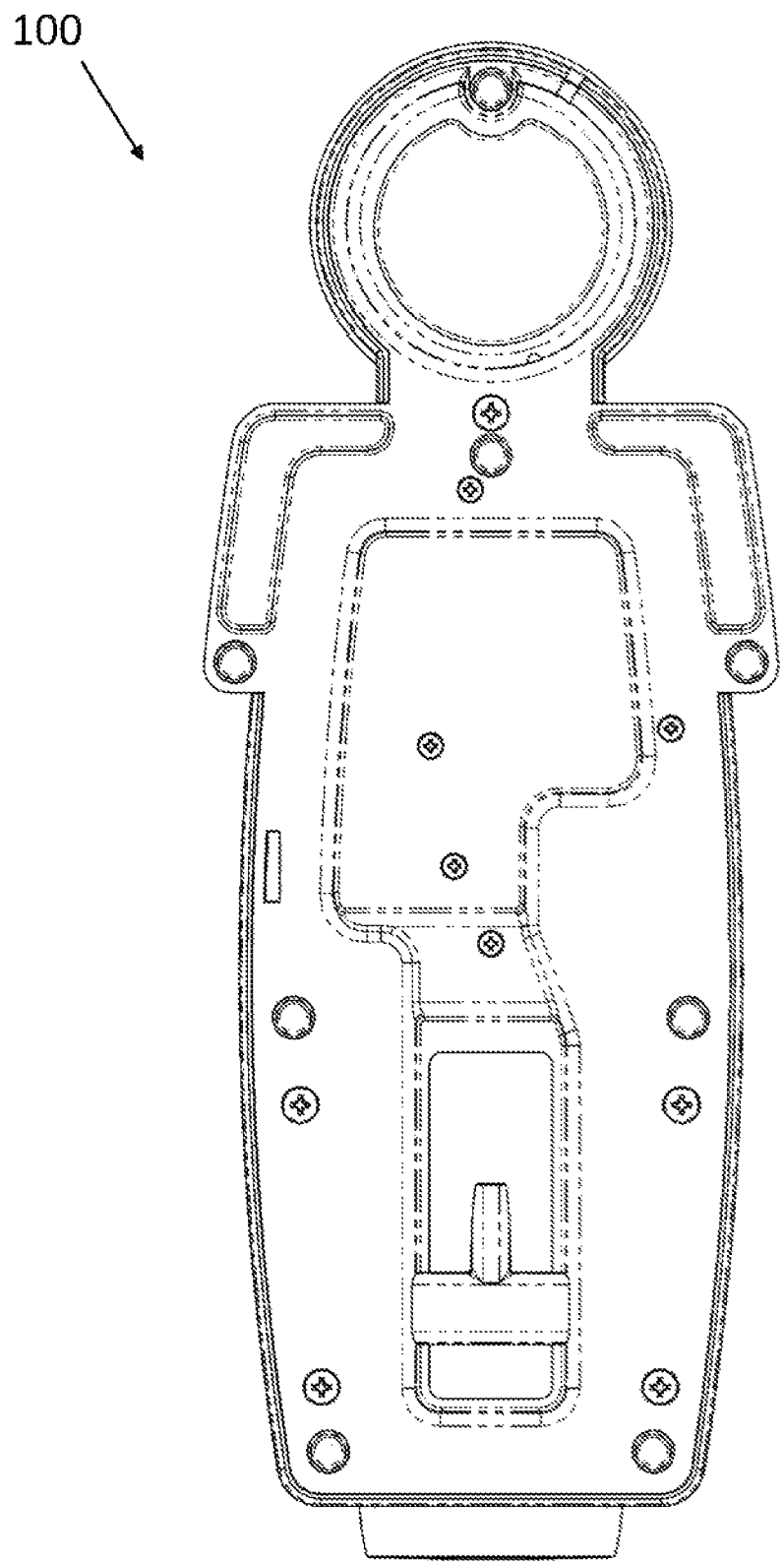
FIG. 8 is a bottom-view illustration of the apparatus for preparing baby formula.

The present invention relates to an appliance that is used to prepare formula used to feed infants and, more particularly, to an apparatus for preparing baby formula using a concentrated solution. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

The present invention is directed to an apparatus for preparing a baby formula using a concentrated baby formula solution. It should be noted that the use of the term "baby", such as in baby formula and concentrated baby formula solution are provided for illustrative purposes of a suitable embodiment and mode using the apparatus as described herein. Thus, although the invention is described and illustrated as being used to generate baby formula, the invention is not intended to be limited thereto as it can be employed to make any formula using a concentrated solution. Further and as clearly understood by those skilled in the art, the apparatus as described herein includes all of the necessary memory, processor, integrated circuits, microprocessors, and/or any other hardware components or wiring, tubing, etc., as may be necessary to implement all of the functions and features as described and illustrated, including all of the electrical connections (wires) and conduits (piping, etc.) as needed and understood by those skilled in the art. However, for clarity and illustrative purposes, the electrical wires, some piping, and integrated circuits have been removed from the drawings to avoid obscuring other details.

As shown in FIG. 1, the apparatus 100 includes a housing 102 with a platform 104 for holding a bottle 106 (e.g., baby bottle). Attached with the housing 102 (or positioned within the housing 102 in another aspect) is a water tank 108. A concentrate solution vessel is included for holding a concentrate solution (e.g., concentrated baby formula solution). The concentrate solution vessel can be separate from the housing 102 or, desirably, positionable or affixed within the housing 102. Thus, in some aspects, the concentrate solution vessel is selectively positioned within the housing 102 during use, whereas in other aspects, the concentrate solution vessel is permanently affixed within the housing 102 and can be selectively refilled as needed. During operation, water is taken from the water tank 108 and mixed with a concentrate solution that is drawn from the concentrate solution vessel to form a desired baby formula 110 at a desired temperature. The baby formula 110 is then dispensed from the apparatus 100 and into the baby bottle 106. For completeness, FIGS. 2 through 8 illustrate a three-quarter view, right-view, left-view, front-view, rear-view, top-view, and bottom-view, respectively, of the apparatus 100 for preparing baby formula. The specific details regarding the apparatus 100 and its various functions are described in further detail below.

Figure 9A:
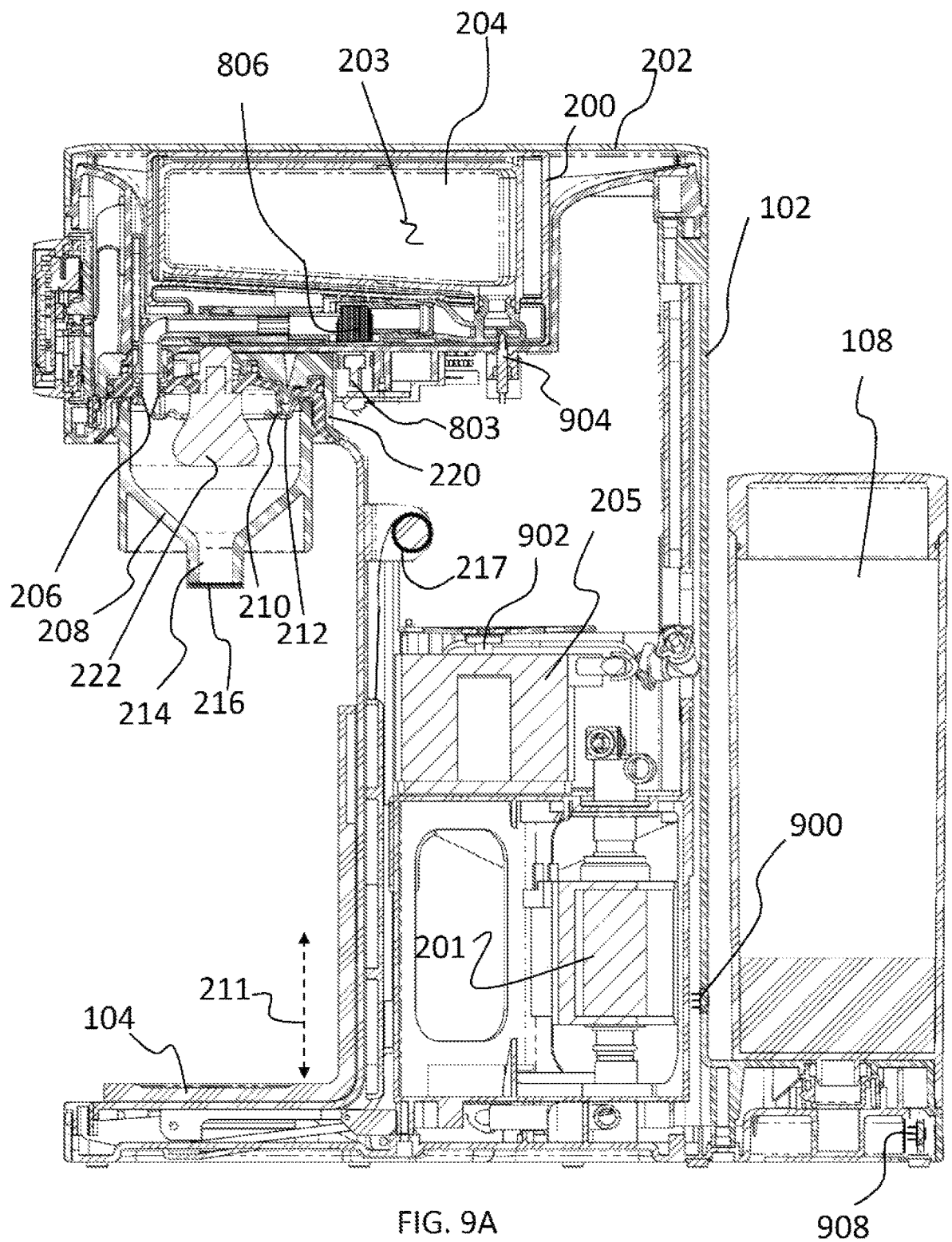
FIG. 9A is a cross-sectional, side-view illustration of the apparatus for preparing baby formula.

As shown in the cross-sectional view of FIG. 9A, the concentrate solution vessel 200 can be selectively positioned in a compartment (e.g., concentrate solution receptor, element 209 in FIGS. 9B and 9C) within the housing 102. Although not required, a lid 202 can optionally be included to conceal the concentrate solution vessel 200 (e.g., while positioned within the concentrate solution receptor 209). As noted above and in various embodiments, the concentrate solution vessel 200 is used to hold a liquid concentrate solution. The liquid concentrate solution can be freely positioned within the concentrate solution vessel 200 or, desirably, be positioned within a concentrate solution pouch 204 or any other suitable container. As a non-limiting example, the concentrate solution pouch 204 is a flexible bag (e.g., plastic bag) or any other suitable container that holds the concentrate solution in a pouch portion 203 (i.e., the portion of the item that actually holds the liquid concentrate solution). As will be described in further detail below, the concentrate solution pouch 204 is in fluidic connection with a concentrate dispenser 206 that dispenses the liquid concentrate solution into a mixing chamber 208. Separately, water is drawn (via a pump 201 or other suitable mechanism or device) from the water tank 108 and sprayed into the mixing chamber 208, where it mixes with the concentrate solution to form the desired baby formula.

In various embodiments, the water is sprayed from one or more spray jets 210 (e.g., six spray jets and one cleansing jet, etc.) that are formed in a spray head 212. The spray jets 210 are angled to dispense the water downward and at an angle to create a swirling motion (e.g., vortex) within the mixing chamber 208. Further, the mixing chamber 208 is desirably funnel shaped to allow the liquid concentrate solution and water to swirl around the mixing chamber 208 and mix thoroughly prior to falling from the mixing chamber 208. In some embodiments the outlet 214 of the mixing chamber 208 is covered by or includes one or more mesh strainers 216. Bubbles that may be formed in the baby formula solution while mixing within the mixing chamber 208 are largely reduced as the baby formula solution passes through the mesh strainers 216 and into a baby bottle.

Figure 9B:
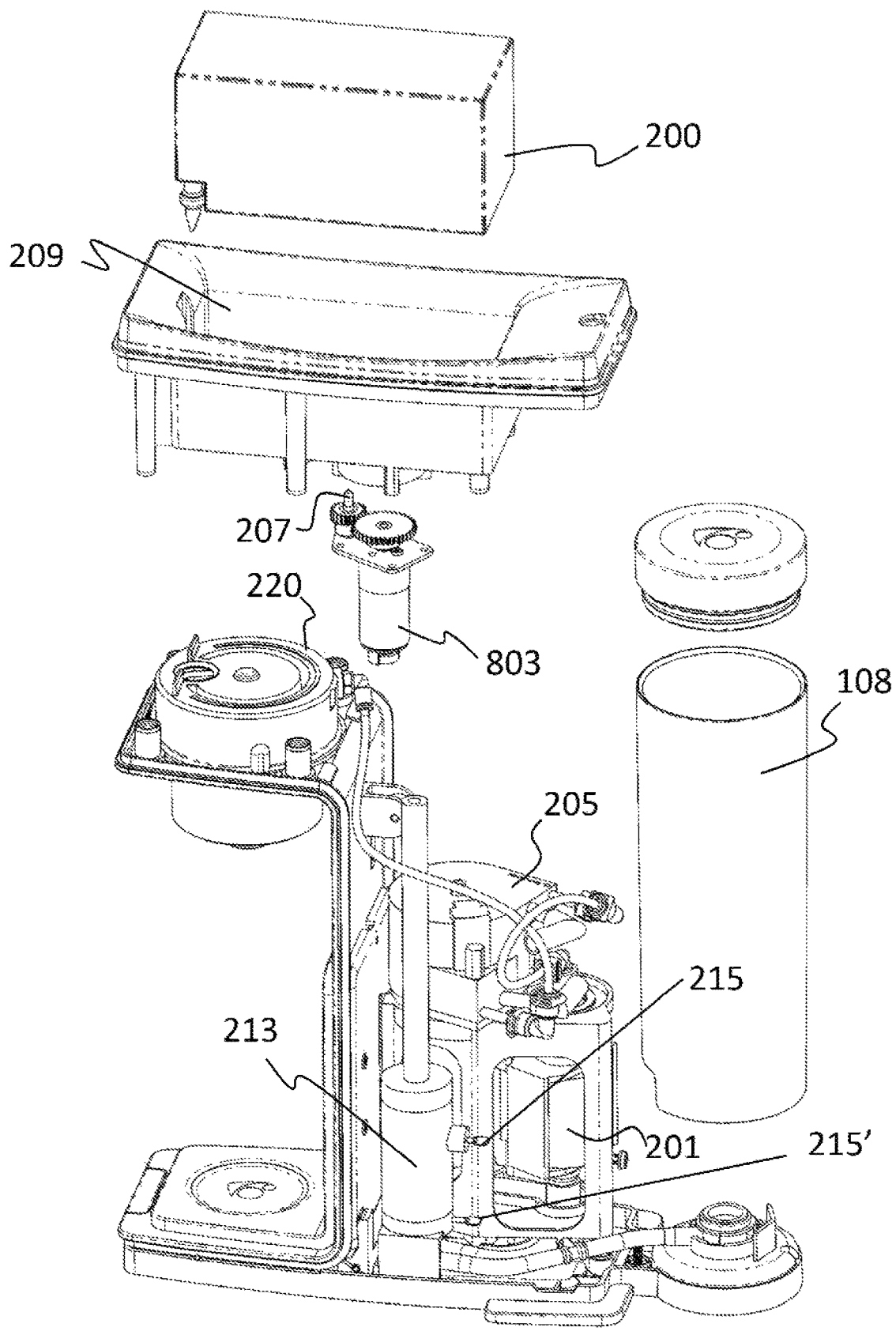
FIG. 9B is a right, interior-view illustration, depicting various components of the apparatus for preparing baby formula.
Figure 9C:
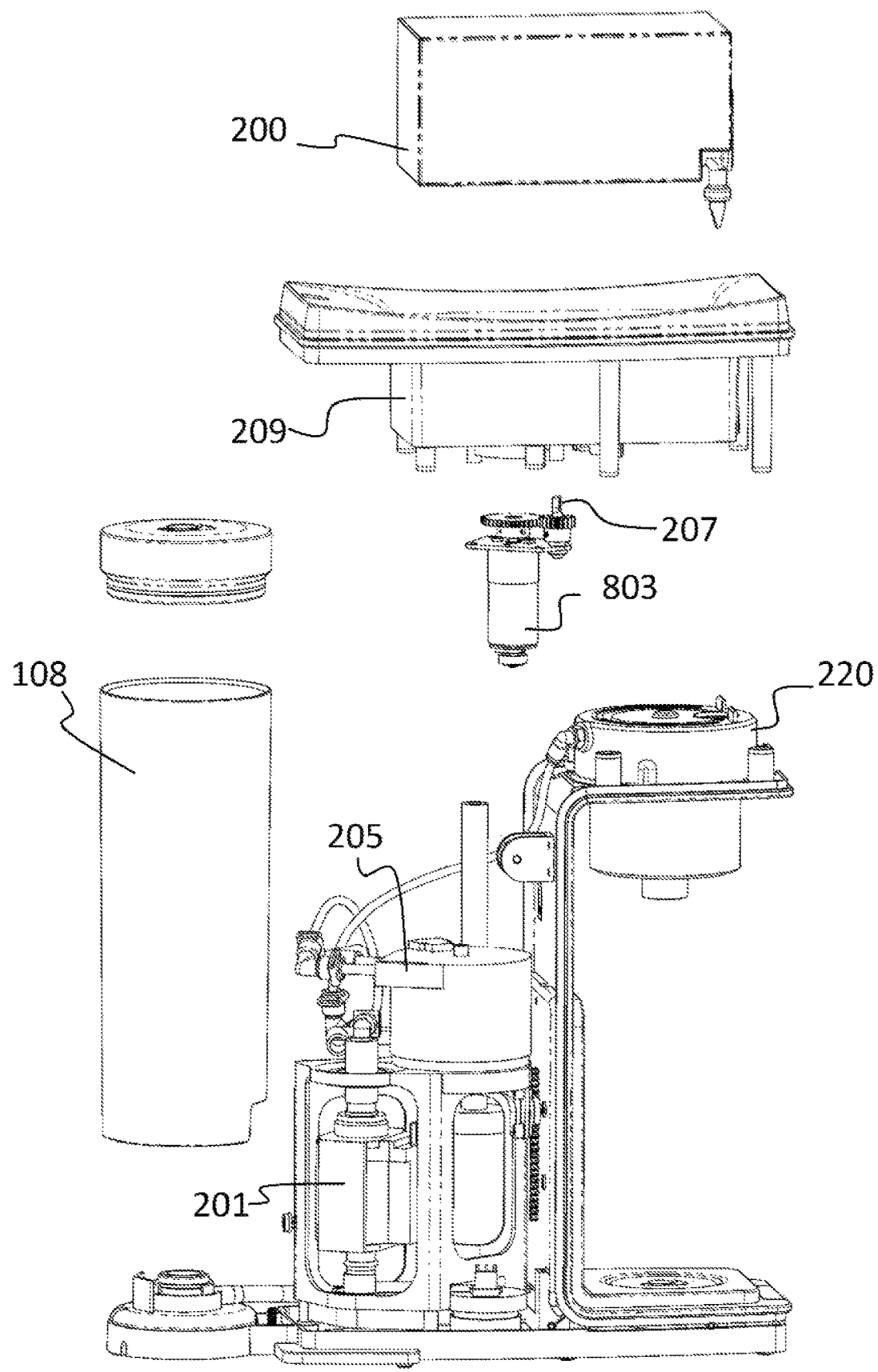
FIG. 9C is a left, interior-view illustration, depicting various components of the apparatus for preparing baby formula.
Figures 9D, 9E:
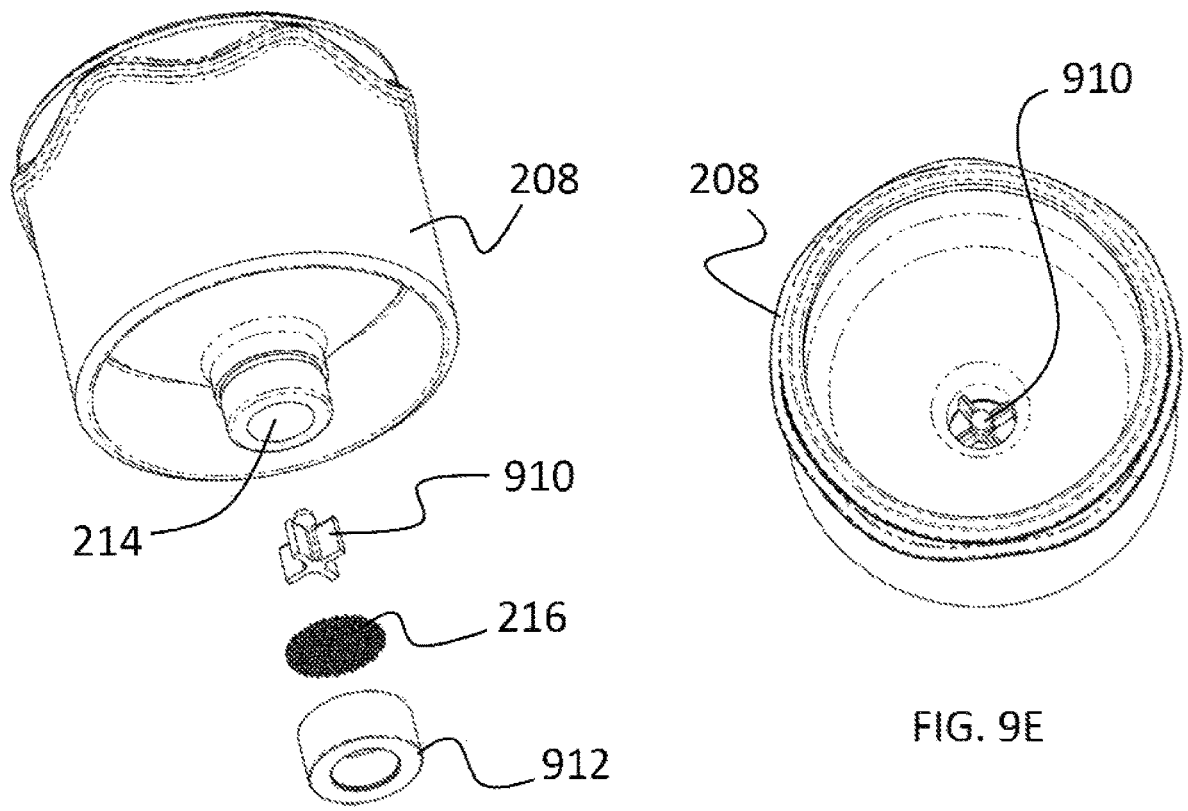
FIG. 9D is an exploded-view illustration, depicting a mixing chamber with a pour centering device.
FIG. 9E is an illustration depicting the mixing chamber with the pour center device.

The strainer 216 is also depicted in FIG. 9D, which illustrates the mixing chamber 208 with a pour centering device 910 positioned within the outlet 214. In various embodiments, a cap 912 or other device can be used to affix the pour centering device 910 a strainer 216 with the outlet 214. The pour centering device 910 is any suitable mechanism or device that is operable for assisting the mixed formula in falling from a centralized and consistent stream from the outlet 214. As a non-limiting example, the pour centering device 910 is a pin surrounded by one or more paddles (e.g., four paddles). The pour centering device 910 is also shown in FIG. 9E.

FIGS. 9B and 9C provide interior-view illustrations depicting additional various components. As shown, the water tank 108 is in fluidic communication (e.g., via piping) with a pump 201 or other suitable component for drawing or otherwise transferring water from the water tank 108. The water can be pumped through a heater 205, which heats the water to a desired temperature before transferring the water to the spray head receptor 220. It should be noted that the apparatus desirably includes the necessary sensors and heaters to heat the resulting mixed baby formula to a desired temperature. This aspect will be described in further detail below. Also shown is the motor 803, with its optional gears and protruding axle 207 that is used to drive a gear pump (described below). Additionally, FIGS. 9B and 9C depict an example concentrate solution receptor 209 that is formed to hold or receive a container holding the liquid concentrate solution, such as the concentrate solution vessel 200 and/or concentrate solution pouch 204 or any other suitable container holding a liquid concentrate solution. As a non-limiting example and as depicted, the concentrate solution receptor 209 is a cavity that can be formed within the housing. As another non-limiting example, the concentrate solution receptor 209 can be a hook from which a concentrate solution pouch 204 is hung, or a shelf upon which the concentrate solution vessel 200 sits, etc.

Additionally, the apparatus can be optionally created to include a water level sensing mechanism 213 which monitors the water level in the tank 108 to ensure that there is adequate water present in the tank 108 before initiating a mixing process to fill a baby bottle with formula. As a non-limiting example, the water level sensing mechanism 213 is fluidly connected with the tank 108 (upstream from the pump 201) and maintains a water level that is similar to that of the tank 108. The water level sensing mechanism 213 includes, for example, two electrical contacts (an upper contact 215 and a bottom contact 215'). When the water level drops below the upper contact 215 (and its pin that protrudes into the water column within the water level sensing mechanism 213), the circuit is broken between the two, indicating that the water is below a desired level.

In various embodiments and referring again to FIG. 9A, the platform 104 for holding the baby bottle can be adjustable. In other words, the platform 104 can be selectively positioned 211 up and down using any suitable mechanism or technique to accommodate baby bottles of various sizes. As a non-limiting example, the platform can be slideably attached with the housing 102 using a spring-loaded system 217 that allows for selective positioning 211 of the platform 104. For example, the spring-loaded system 217 includes a constant force spring that allows for selective positioning 211 of the platform 204. Alternatively, the spring-loaded system 217 can be arranged differently to include a tension or compression spring.

As can be understood by those skilled in the art, the process of mixing a concentrate solution with water can result in components that are dirty and need washing. Failure to rinse or properly wash the components may lead to undesirable bacteria. Thus, in various embodiments, several of the components can be easily removed from the apparatus 100 for cleaning, such as in a dishwasher. For example, the spray head 212 and mixing chamber 208 are easily detached from the apparatus 100 for ease of cleaning.

In some embodiments, the spray head 212 and mixing chamber 208 are detachably attachable using any suitable mechanism or technique for providing selective detachment/attachment. As a non-limiting example, the spray head 212 is selectively affixed against a spray head receptor 220 (which is affixed within the apparatus) using any suitable locking device 222. For example, the locking device 222 can be a twist type cam lock that passes through a hole in the spray head 212 and into appropriate channels in the spray head receptor 220 to tighten and lock the spray head 212 against the spray head receptor 220. Further, the mixing chamber 208 can be easily detached, for example, using a cam and magnet system, which is clearly illustrated in FIGS. 10 and 11.

Figure 10:
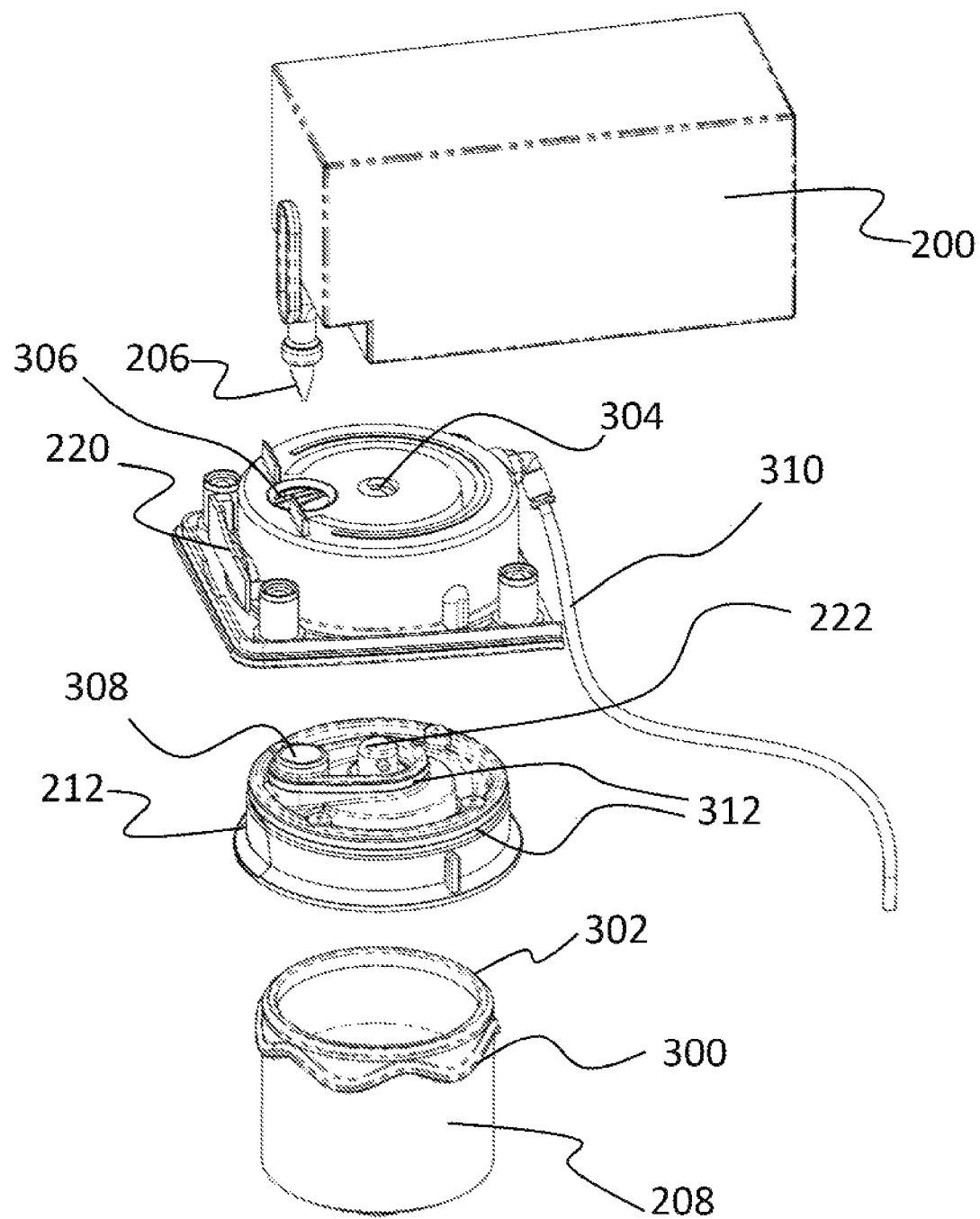
FIG. 10 is a top, exploded-view illustration of various components of the apparatus for preparing baby formula.
Figure 11:
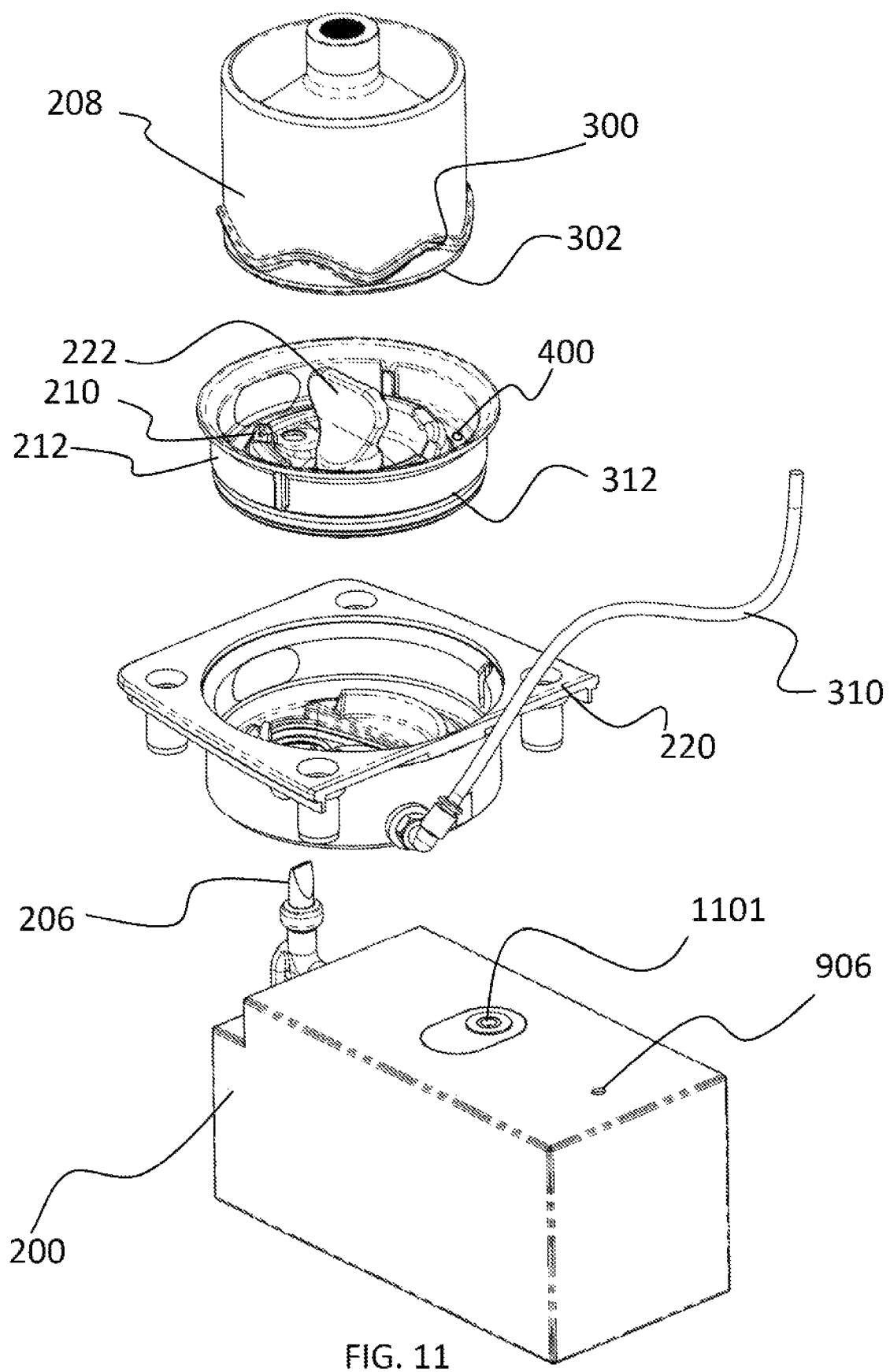
FIG. 11 is a bottom, exploded-view illustration of the components depicted in FIG. 10.

As shown in FIGS. 10 and 11, the mixing chamber 208 includes a cam-shaped ridge 300 that passes around the entire circumference of the mixing chamber 208. Around the top of the mixing chamber is a magnetic or metal ring 302, which magnetically attaches with corresponding metal or magnets 400, respectively, within the spray head 212. Also shown in FIG. 10 is the locking device 222 that locks against appropriate cam channels 304 within the spray head receptor 220.

The concentrate solution vessel 200 and its corresponding concentrate dispenser 206 are also depicted. In operation, the concentrate dispenser 206 passes through holes 306 and 308 in both the spray head receptor 220 and spray head 212, respectively, to dispense the concentrate solution into the mixing chamber 208. Further, water is introduced via a conduit 310 into a small gap (water cavity or channel) between the spray head 212 and spray head receptor 220. The water passes around the gap (which acts as a water channel to the spray jets 210) and is ultimately dispensed from the spray jets 210 into the mixing chamber 208. One or more O-rings 312 or other suitable sealing mechanisms or devices are used to seal the spray head 212 against the spray head receptor 220 and, in doing so, seal the gap formed between the two components.

Figure 12:
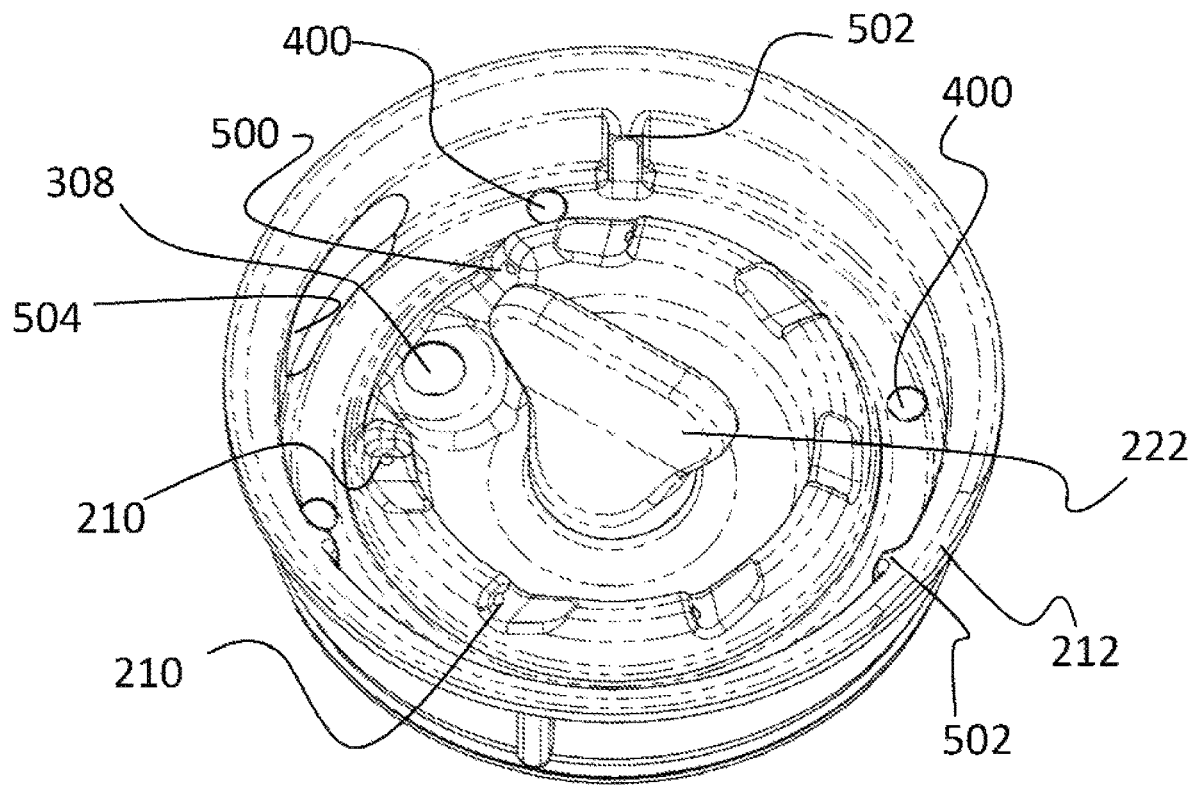
FIG. 12 is a bottom-view illustration of a spray head according to various embodiments of the present invention.

For further understanding, FIG. 12 provides a bottom-view illustration of the spray head 212. As shown, a plurality of spray jets 210 are positioned within the spray head 212. Also shown is a cleansing spray jet 500. The cleansing spray jet 500 receives water from the gap and directs water directly towards the concentrate dispenser when said concentrate dispenser protrudes from the hole 308 in the spray head 212 and is dispensing the concentrate solution (and for a short period afterward in some embodiments). In other words, the cleansing spray jet 500 actually continually rinses the concentrate dispenser during operation to increase sterility.

The lock 222 is also shown. As can be appreciated by those skilled in the art, when the mixing chamber is removed, a user can easily grasp the lock 222 from its handle-shaped head (as depicted in FIG. 12) and twist the lock 222, which releases it from the spray head receptor.

A collection of magnets 400 are also shown. As noted above, the magnets 400 are used to selectively hold the mixing chamber against the spray head 212. The spray head 212 can also be formed to include a collection of protrusions 502. In various embodiments, to remove the mixing chamber from the spray head 212, the mixing chamber is simply twisted. Because the mixing chamber includes a cam, the mixing chamber is pulled away slightly from the spray head 212 due to the presence of the protrusions 502, which in effect pulls the mixing chamber away from the magnets 400 to cease the magnetic connection between the two components.

Also depicted is a window 504 (e.g., translucent plastic or glass window). The window 504 can be used for a variety of features. As a non-limiting example, an L.E.D. or other light can be positioned within the apparatus and in line with the window 504, which can be used to illuminate the mixing chamber or formula. As another example, a sensor (e.g., light sensor, infrared sensor (IR), etc.) can be positioned within the apparatus and in line with the window 504, which can be used to sense the presence of the mixing chamber. In other words, if the sensor and associated hardware or circuitry does not detect the presence of the mixing chamber, then the apparatus cannot be activated to mix and dispense formula. Although not shown, it should be noted that the apparatus can also be formed to include a bottle sensor (at the appropriate location) to prevent the accidental dispensing of baby formula when a bottle is not physically present under the opening of the mixing chamber. The apparatus, for example, can have an IR sensor or any other suitable sensor that is operable for sensing if a bottle is present in the apparatus at the appropriate location to receive the combined baby formula solution.

Figure 13:
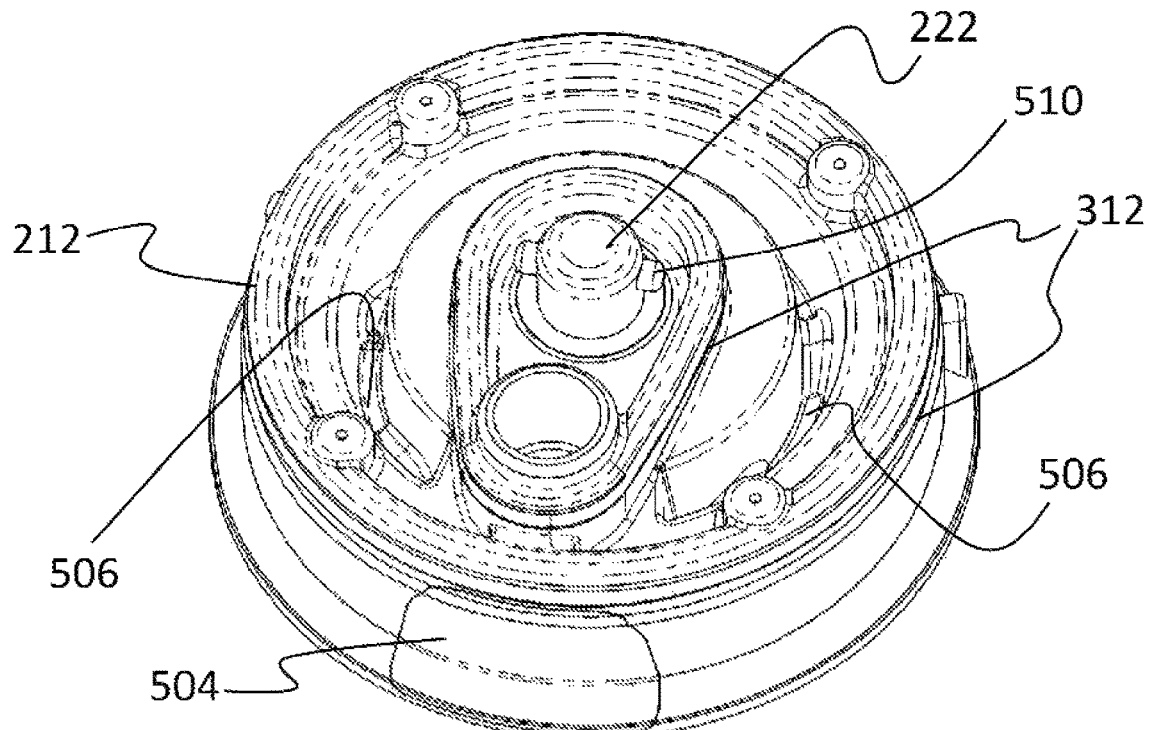
FIG. 13 is a top-view illustration of the spray head depicted in FIG. 12.

FIG. 13 provides a top-view illustration of the spray head 212. Also shown is the window 504 and lock 222 (with its lock protrusions 510 that can be used to twist it into and lock against the spray head receptor). The O-rings 312 are also depicted, which are used to seal the gap formed between the spray head 212 and spray head receptor. In various embodiments, a water channel 506 is formed within the spray head 212. The water channel 506 serves as the gap that receives water from the spray head receptor and directs water to the spray jets.

Figure 14:
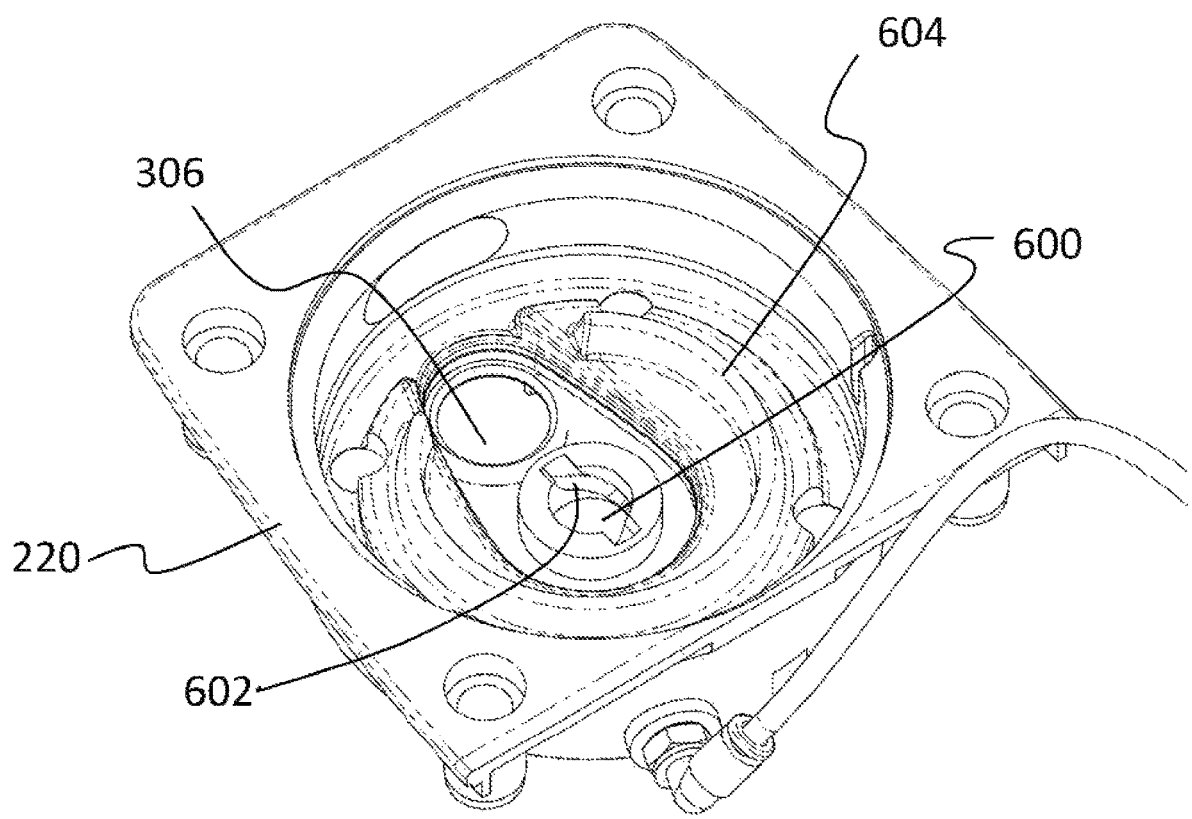
FIG. 14 is a bottom-view illustration of a spray head receptor according to various embodiments of the present invention.
Figure 15:
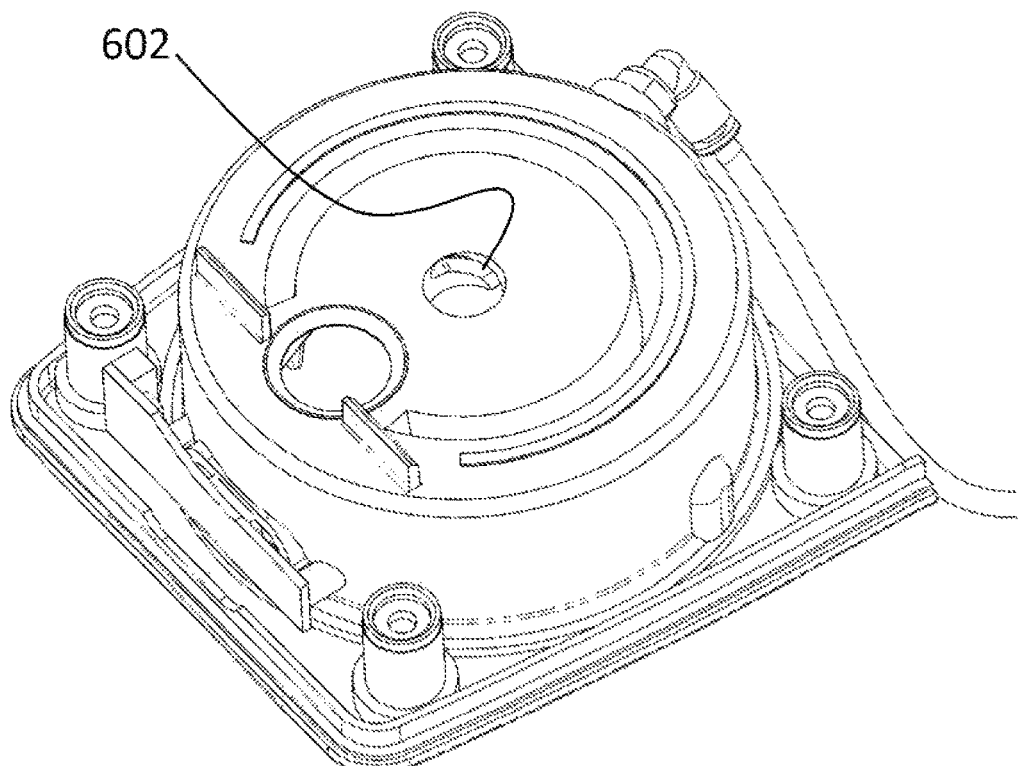
FIG. 15 is a top-view illustration of the spray head receptor depicted in FIG. 14.

FIG. 14 provides a bottom-view illustration of the spray head receptor 220. As shown, the spray head receptor 220 includes a lock hole 600 through which the lock can pass. Cam channels 602 are depicted as being formed in the walls of the lock hole 600. The cam channels 602 (also shown in FIG. 15) receive the lock protrusions (as depicted in FIG. 13) and allow a user to twist the lock and, in doing so, pull the spray head tightly into and lock against the spray head receptor 220.

The spray head receptor 220 also includes a hole 306 and window 604 (e.g., translucent plastic, glass, etc.). When connected with the spray head, the hole 306 and window 604 align with a corresponding hole and window (i.e., element 308 and 504 in FIG. 12) in the spray head.

In various embodiments a volume filler 604 is formed in the spray head receptor 220. The volume filler 604 is, for example, a molded ridge that partially fills the water channel (i.e., element 506 in FIG. 13) in the spray head. In other words, the volume filler 604 operates to decrease the actual size of the gap that is formed between the spray head and spray head receptor 220 and, in doing so, reduces the amount of water that is within the water channel (i.e., the gap) at any given time. The volume filler 604 minimizes the volume of water, forward of the heater, to make dispensing small volumes possible. In various embodiments, the volume of water forward of the heater is uncontrolled in terms of temperature, depending on when the last bottle was dispensed. With, for example, just a 2 ounce bottle being dispensed, this volume can have a significant impact on the resulting temperature. Thus, by minimizing the amount of water in the gap, the apparatus is able to dispense even small amounts of water without losing much heat or temperature of the water following the heater.

Figure 16A:
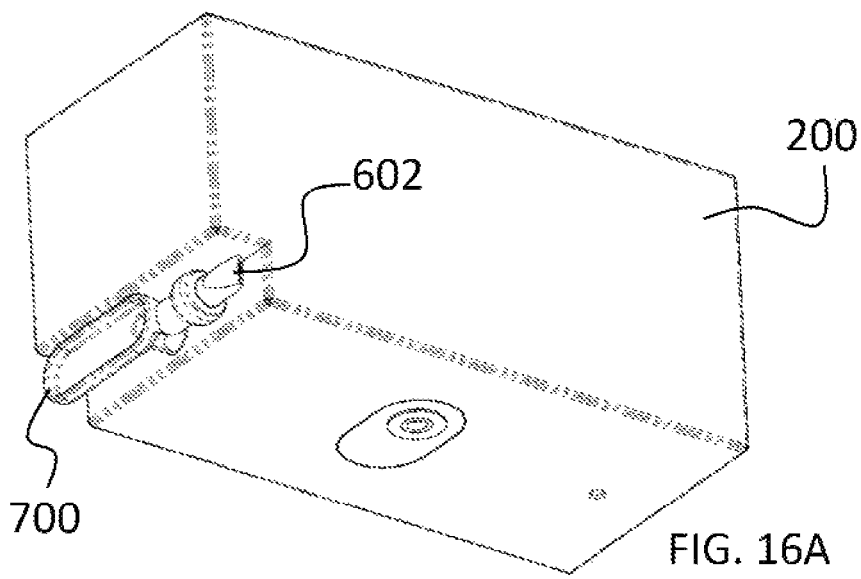
FIG. 16A is an illustration of a concentrate solution vessel according to various embodiments of the present invention, depicting the vessel in a closed and sealed state.
Figure 16B:
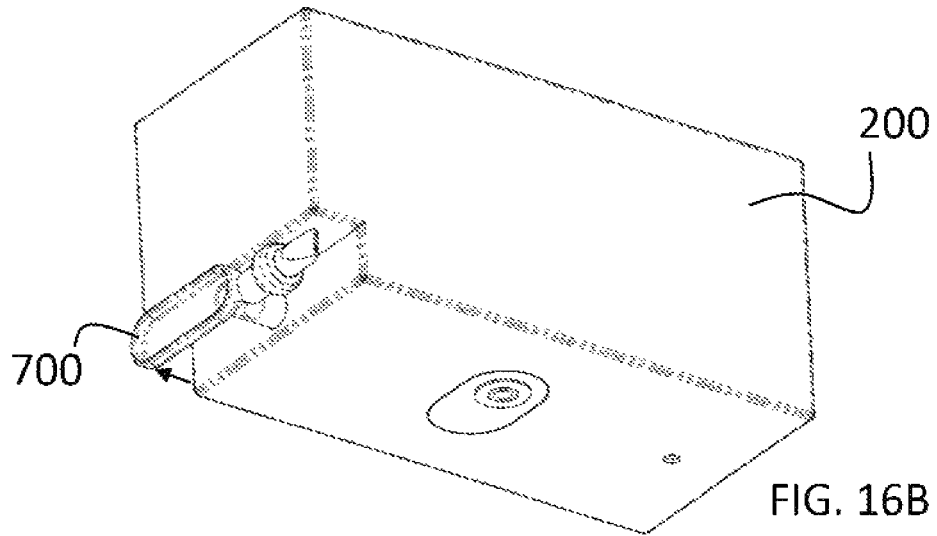
FIG. 16B is an illustration of the concentrate solution vessel, depicting the vessel in a transitioning state.
Figure 16C:
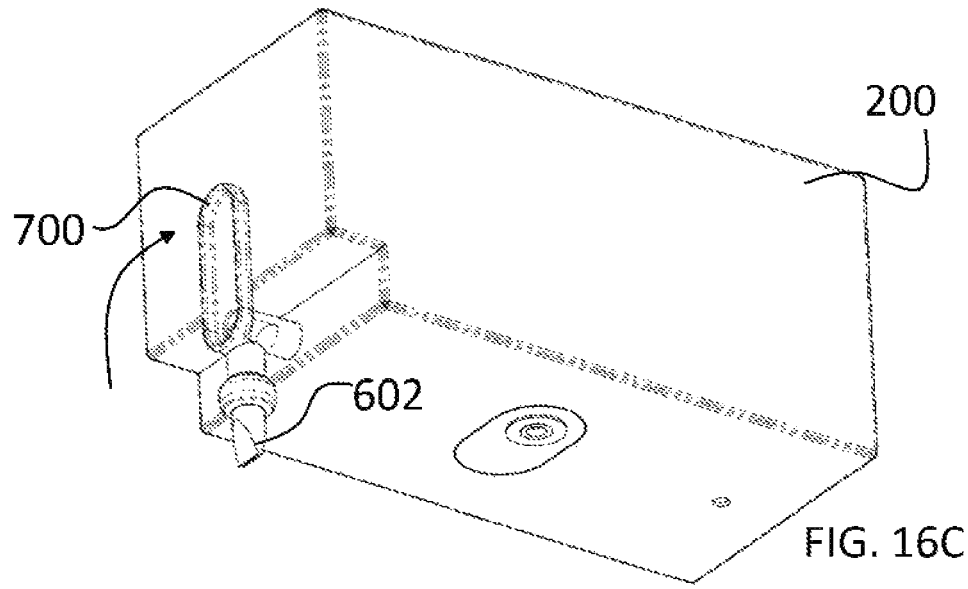
FIG. 16C is an illustration of the concentrate solution vessel, depicting the vessel in an opened state.

As noted above and as depicted in FIGS. 16 through 16C, a concentrate solution vessel 200 is optionally included that can be selectively positioned in a compartment within the housing (or onto or otherwise attached with the housing). The concentrate solution vessel 200 in this aspect includes several unique features. The concentrate solution vessel 200 can be sealed and selectively opened using any suitable mechanism, technique or device. As a non-limiting example, a handle 700 is attached with the concentrate dispenser 206. In a closed and sealed state (as depicted in FIG. 16A), the handle 700 is tight against the vessel 200, with the concentrate dispenser 206 turned away from a dispensing position. To prepare the vessel 200 for usage, a user pulls the handle 700 from the vessel 200 and twists the handle 700 upwards (as shown in FIGS. 16B and 16C). In doing so, the concentrate dispenser 206 is then pivoted downwards and into a dispensing position (opened state). Pulling and twisting the handle 700 also opens a locked valve within the vessel 200 to open the relevant fluid passageway for dispersion of the concentrate solution.

Figure 17:
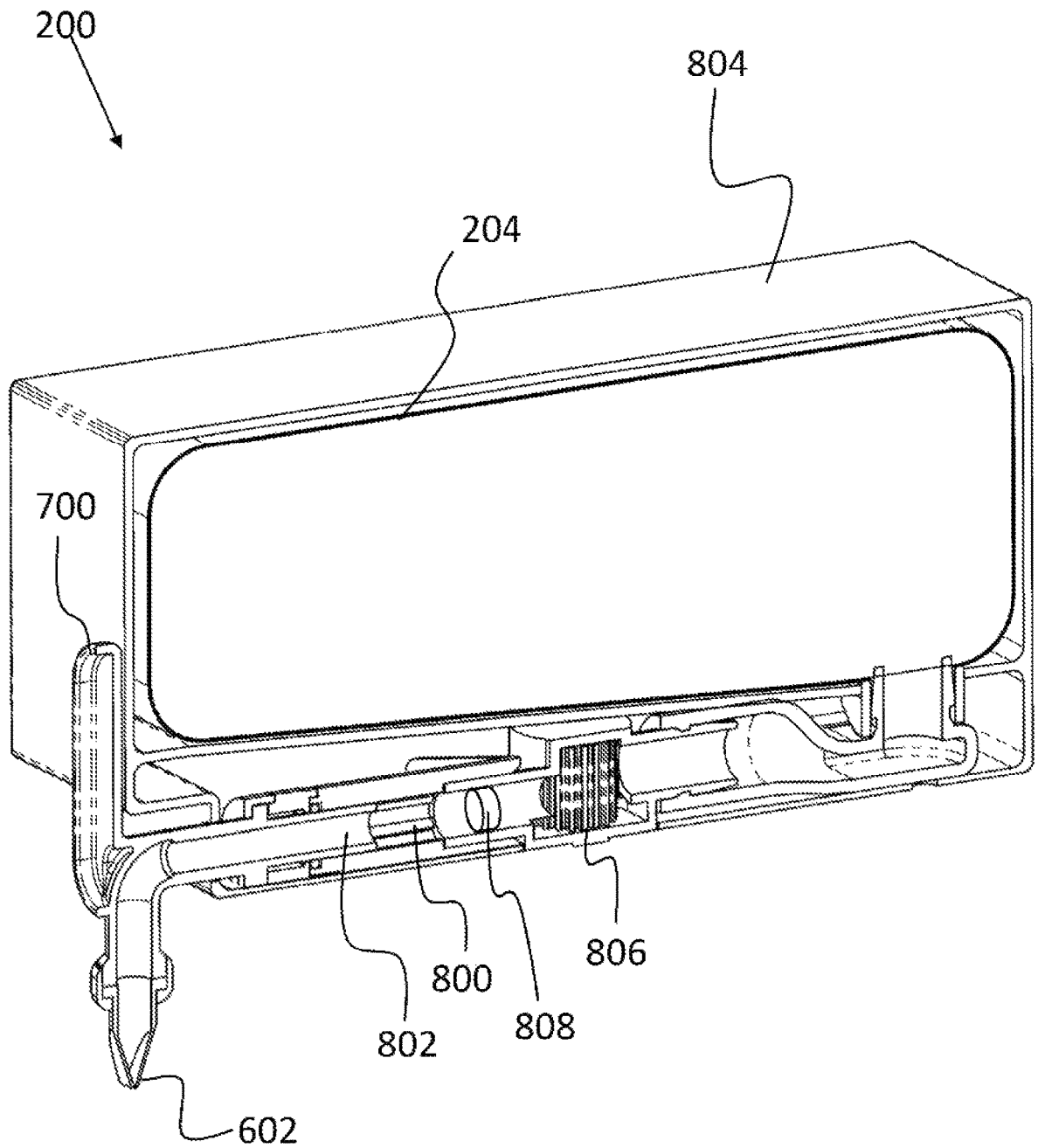
FIG. 17 is a cross-sectional view illustration of the concentrate solution vessel, depicting a valve and pump mechanism attached with a concentrate solution pouch.

For further understanding, FIG. 17 provides a cross-sectional view of the concentrate solution vessel 200, depicting various internal components of the vessel. As noted above, pulling the handle and then twisting the handle 700 upwards opens a locked valve 800 to open a fluid passageway 802 within the concentrate solution vessel 200 and move the concentrate dispenser 206 into a "in-use" position (or opened state as shown in FIG. 16C). Thus, the locked valve 800 is then moved into an "open" position. Optionally, a thin sterile membrane can be included within the fluid passageway 802 such that as the user moves the nozzle into the in-use position (and the locked valve 800 is opened), the membrane is torn to break a hermetic seal.

Figure 18A:
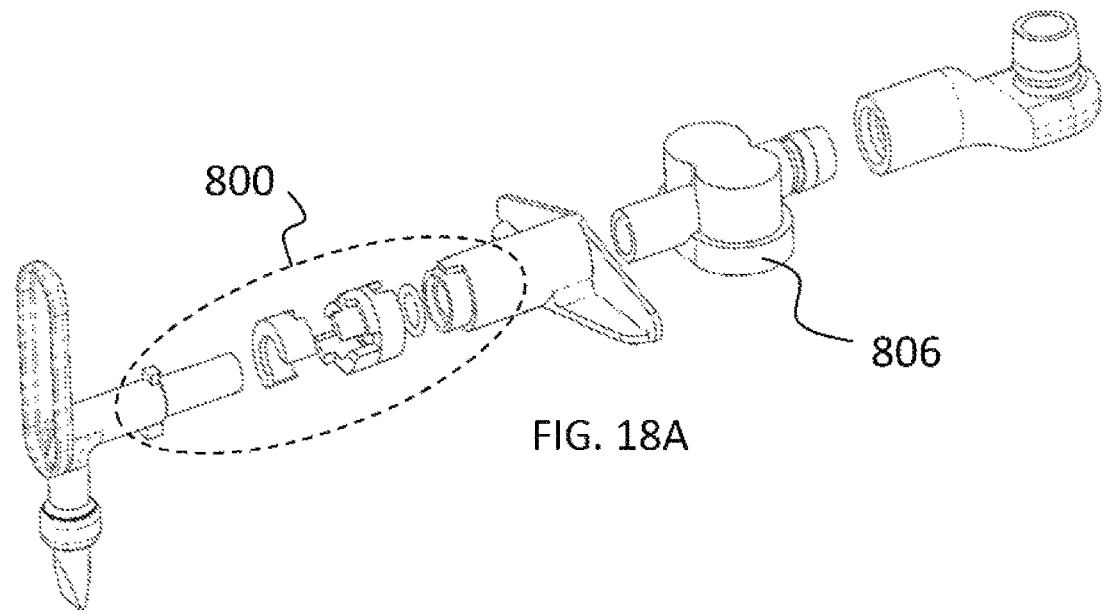
FIG. 18A is a top, exploded-view illustration of the valve and pump mechanism.
Figure 18B:
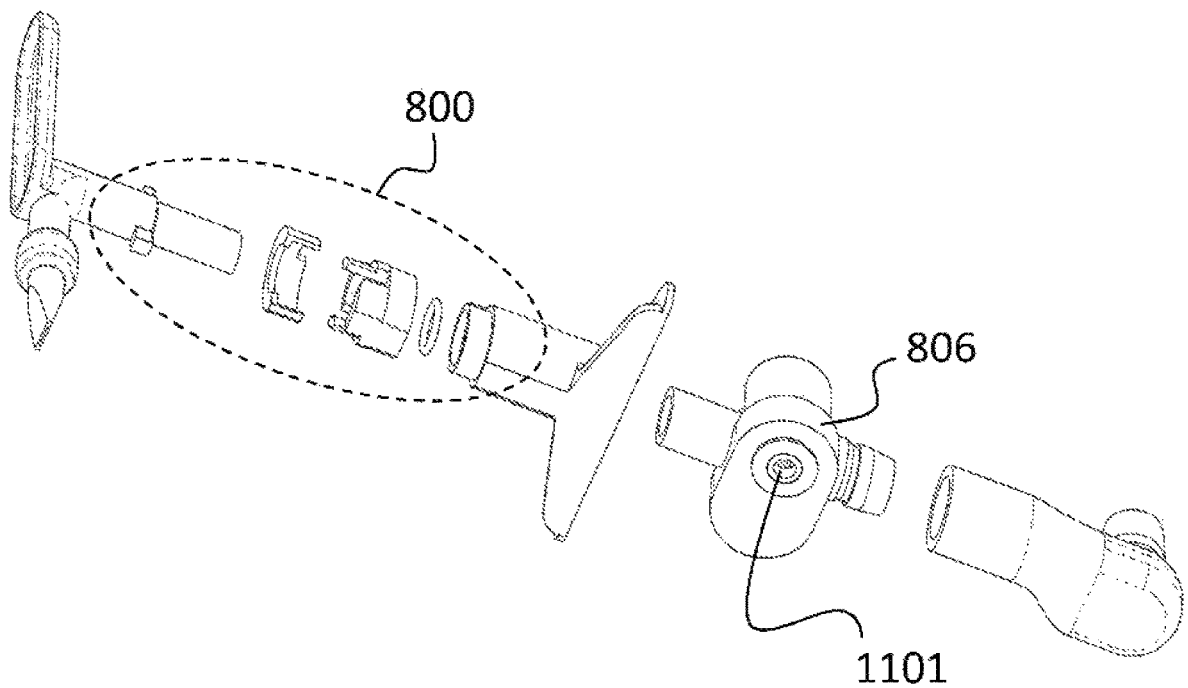
FIG. 18B is a bottom, exploded view illustration of the valve and pump mechanism.

In various embodiments, the concentrate solution vessel 200 includes a rigid outer housing 804 (e.g., plastic shell or cardboard box) that contains a flexible concentrate solution pouch 204. The concentrate solution is contained within the flexible concentrate solution pouch 204, which is in fluidic connection (via conduits, piping, etc.) with an extraction device, such as a gear pump 806 (or other suitable pumping mechanism or device). A gear pump 806, for example, uses the meshing of gears to accurately pump fluid by displacement. For further understanding, FIGS. 18A and 18B depict top and bottom, exploded-views, respectively, of the valve and pump mechanism, including the locked valve 800 and gear pump 806. Referring again to FIG. 9A, the gear pump 806 is actuated using a motor 803 (the axle of the motor, for example, can be positioned into the gear pump axle receptor 1101, as shown in FIGS. 11 and 18B) or other suitable device that is operable for turning the gears of the gear pump 806. Through the use of the gear pump 806 or similar mechanism, the apparatus is operable for dispensing different liquid concentrate solutions with the mixing of water in a measured or controlled or repeatable way. Importantly, the use of the gear pump 806 allows the apparatus to selectively and accurately dispense the desired liquid concentrate solution.

Referring again to FIG. 17, desirably, the concentrate solution vessel 200 includes a one-way valve 808 (which operates as a primary valve) positioned at an appropriate location within the fluid flow. As a non-limiting example, the one-way valve 808 can be positioned downstream from the gear pump 806, which would prevent any fluid or contaminant from flowing back to contaminate the gear pump 806. Further, the vessel 200 includes a secondary valve for further sterility of the liquid concentrate solution. As a non-limiting example, the concentrate dispenser 206 is a duck-bill valve that operates as a secondary valve. Thus, in rinsing the concentrate dispenser 206 (by the cleansing jet) and because it is a duck bill valve, water or any other contaminant is not allowed to pass up and into the concentrate dispenser 206 and vessel 200.

The gear pump 806 allows the apparatus to selectively pump the liquid concentrate solution from a container or, in various embodiments, the concentrate solution pouch 204. The gear pump 806 functions to quickly dispense the liquid concentrate solution in an accurate manner. What the gear pump does not do is have a valve mechanism to prevent the liquid concentrate solution (or other liquid) from dripping out of the vessel 200. The one-way valve 808 described above serves as a valve that opens and closes the opening so that nothing inside the vessel 200 will leak out when the gear pump 806 is not in operation. A problem with such a one-way valve 808 is that there may be solution or other material trapped in the housing/conduit around and after the one-way valve 808, which if left open and exposed to the environment would spoil. To close off this exposed area, the duck-bill valve (secondary valve) is used so that the contained concentrate solution does not get exposed/contaminated to the outside environment (for example, air or water during rinsing). It should be noted that although a locked valve 800, a one-way valve 808 and duck-bill valve (i.e., concentrate dispenser 206) are described and illustrated, the invention is not intended to be limited thereto as any suitable valve mechanism or mechanisms may be incorporated into the apparatus according to the principles of the present invention.

It should be noted that, in one aspect, the gear pump 806 is disposable. In other words, the invention includes a disposable container (such as the pouch 204) attached with the gear pump 806. The gear pump 806 is in fluid communication with the one-way valve 808 and, thereafter, the duck-bill valve (e.g., concentrate dispenser 206). Thus, the pouch 204, gear pump 806 and valves can be disposed of separately and replaced or, in another aspect, they are contained within the hard outer housing 804 that can be disposed of and replaced (as depicted with respect to the vessel). In either configuration, because the gear pump 806 is disposable (and replaceable), the likelihood of contamination is dramatically reduced. Further, because the pouch 204 is connected with the gear pump 806 and valves (e.g., one-way valve 808 and duck-bill valve (e.g., concentrate dispenser 206)) as a single unit, all of the gears and valves are replaced each and every time a user needs to replace the pouch 204 and liquid concentrate solution, thereby further supporting efforts to reduce contamination.

Additionally, the pouch 204 is collapsible to provide complete emptying of the liquid concentrate solution, which decreases waste and eliminates contamination. In other words, the gear pump 806, one-way valve 808, and duck-bill valve all work in tandem to draw the liquid concentrate from the pouch 204 and prevent backflow of air into the system which allows for complete emptying of the pouch 204 and provides superior sterility as compared to the central hopper or single serve powder machines of the prior art.

Further and as noted above, the apparatus desirably includes the necessary sensors and heaters to heat the resulting mixed baby formula to a desired temperature and dispense a desired volume, a non-limiting example of such a heating system and volume control is provided below. To control the temperature and/or volume, the apparatus includes an input control, such as buttons, a dial, etc. As a non-limiting example and as depicted in FIG. 1, the apparatus 100 can be formed to include a control unit. The control unit, for example, includes a push display 110 surrounded by a twistable dial 112. The push display 110 can be used to display, for example, the desired temperature and selected volume to be mixed and dispensed. In this non-limiting example, a user can press the push display 110 to turn on the unit or select the item to be adjusted. If selecting temperature for example, the user can push the push display 110 to select temperature and then rotate the twistable dial 112 until reaching the desired dispensed temperature (which is displayed on the push display 110). Pressing the push display 110 would then set the desired temperature and allow the user to select other options, such as the amount of volume to be dispensed. Similarly, the user would twist the twistable dial 112 and press the push display 110 to ultimately select the desired volume.

In operation, the user first turns on the apparatus, using either the control unit or any other suitable mechanism or device for turning on/off a device, such as a rocker switch. Referring to FIG. 9A, at this point the firmware within the apparatus reads temperature of: (1) the water (via a first temperature sensor, for example, an IR sensor module 900) within the water tank 108, (2) the heater 205 (via a second temperature sensor, for example, a bead thermistor 902 epoxied to the surface of the heater 205 (or embedded within the heater 205 body)), and (3) the concentrate solution within the vessel 200 (via a third temperature sensor, for example a temperature probe 904 that senses through a window 906 formed in the bottom of the vessel). The temperature probe window 906 can be seen, for example, in FIG. 11. Instead of sensing the concentrate solution within the vessel 200, the ambient air can optionally be sensed via a probe thermistor 908 placed in the back of the unit under the water tank 108 platform (or at any other suitable location). Knowing only these three temperatures (water tank 108 temperature, heater 205 and ambient (or desirably, the concentrate solution temperature within the vessel 200)) and the user inputs, the algorithm will produce a bottle at any specified volume (between, for example, 2 and 8 ounces) and temperature (between, for example, 74 and 98° F.). Since the formula (i.e., liquid concentrate solution) should be stored at room temperature, i.e. not refrigerated, the ambient temperature (via the probe thermistor 908) is used to represent the temperature of the formula concentrate in the vessel 200. Alternatively, for a more precise measurement, the apparatus desirably uses the temperature probe 904 to determine the actual temperature of the concentrate solution in the vessel 200. Thus, it should be understood that for convenience purposes, the invention is described below with respect to ambient air; however, the invention is not intended to be limited thereto and all references to ambient air can be replaced with the temperature probe 904 that determines the actual temperature of the concentrate solution in the vessel 200.

As soon as the apparatus is turned on, it checks whether the heater 205 is decreasing or steady in temperature. If it is decreasing in temperature, it means that the heater 205 is cooling from making a bottle. This is important as it will drive the algorithm in making multiple bottles in succession. Next the user inputs a desired temperature and volume. With these two inputs, along with temperatures gathered from sensors, the unit is ready to begin calculating how it will heat the water. Because the resulting bottle is to be made up for equal volumetric parts formula concentrate solution and water, a relationship was determined to calculate how much to heat the water so that a mixture of heated water and room temperature formula concentrate solution would make a bottle at the desired temperature. It should understood that although the description herein is directed to a relationship based on equal volumetric parts formula concentrate solution and water, the invention is not intended to be limited thereto and can be modified as desired to account for alternative volumetric relationships.

Knowing the target value to raise the water temperature, extensive testing was conducted to correlate time to turn on the heater before the unit begins pumping water. The amount of time the heater 205 is on for before the water starts pumping is referred to herein as "pre-heat time." Pre-heat time can be a negative value because if the water does not need to be heated very much to reach the desired temperature, the water will start pumping before the heater turns on. A look-up table for the firmware was created to determine pre-heat time given ambient temperature, water tank temperature and desired final temperature of the bottle.

A unique aspect of this apparatus is the ability to make multiple bottles in succession at the desired temperature. To make this possible, the current state of the heater 205 is accounted for. If not, the following bottles would come out hotter and hotter each time. Extensive testing was done to characterize the temperature of the heater 205 to decrease time the heater needed to be on. Another look-up table for the firmware was made to determine how much to decrease the pre-heat time given the existing temperature of the heater.

All these calibrations and look-up tables were conducted while the unit had been running for multiple bottles. Another calibration had to be performed to understand how much extra time the unit has to run the heater 205 when the unit is run from when it is turned on and had been at rest. This look-up table was created and implemented to account for the energy lost in heating up the post-heater elements that act as heat dissipaters when not warmed up (all of which happen behind the scenes right when the user initiates the process).

Once the user presses to make a bottle, the apparatus displays a screen indicated that it is preparing the bottle and flashes a light. This indicates that the heater is pre-heating and not pumping water yet. When it is finally done pre-heating, water will begin pumping out and the apparatus will display a progress bar. After a designated amount of time, the liquid concentrate solution will begin pumping out of the concentrate solution vessel 200. Since the liquid concentrate solution pumps out faster than the water, it will end for a period of time (e.g. two seconds, etc.) before the water cuts out. In various embodiments, the liquid concentrate and water will begin pumping at approximately the same time. The water can simply carry on for a second or more after the liquid concentrate stops pumping to cleanse the duck-bill valve. After the water stops pumping, the bottle is ready for consumption and the unit will display a ready check mark.

A more detailed non-limiting example of the heating process is provided below.

Step 1: User turns on the apparatus.

Step 2: Screen turns on. The control unit displays that the apparatus is on and ready.

Step 3: User selects temperature and volume. By turning the interactive display, the user selects the volume (2-8 ounces) and the temperature (74-98° F.) they want the resulting mixed formula in the bottle to be.

Step 4a: Apparatus gathers temperature of environment. When the apparatus is turned on, it reads the temperature of the water tank 108 via the IR sensor module 900, ambient temperature via a probe thermistor 908, and temperature of the heater 205 via a bead thermistor 902 that is epoxied to the heater.

Step 4b: Apparatus calculates how much to preheat water heater. To determine how long to preheat the water, the apparatus uses the user's desired temperature and volume as well as the temperatures gathered from Step 4a. First the unit finds a weighted average of the formula concentrate solution temperature and water temperature. The formula is weighted to account for the difference in the specific heat. "Formula temperature" is represented by ambient temperature because the liquid (formula) concentrate solution is expected to be stored and used at room temperature. The weighted average is determined as follows:

$$\text{Specific Heat of Water} = 4.186 \frac{J}{g° C.}$$

$$\text{Specific Heat of Formula} \approx 3.90195 \frac{J}{g° C.}$$

Weighted Average =

$$0.518 \times \text{Water Tank Temp} + 0.4824 \times \text{Formula Temperature}$$

Step 4c: Apparatus calculates how much to preheat water heater. This weighted average value is used in conjunction with the user's desired temperature input to determine how much to preheat the water. Derived by the following relationship, the pre-heat time look-up table is shown in Table 1, which is depicted in FIGS. 19A and 19B. The preheat time is determined as follows:

Preheat Time =

$$0.9602 \times ((0.9657 \times \text{Desired Final Temp}) - \text{Weighted Average}) - 13.675 \text{ s}$$

This algorithm was the result of a regression that mapped the heating time to water temperature, which took hundreds of tests. This function applies to all volumes. Adjustments for volume will be made in Step 4c.

In Table 1, there are negative values. If the pre-heat time is negative, that means the heater will turn on after the water has started pumping as it needs to heat the water only a small amount. Also to make sure the heater does not pre heat too long and boil the water, the pre-heat time is capped at, for example, 32 seconds.

Step 4d: Apparatus makes adjustment to target temperature to account for heater state. Because the apparatus must be capable of making multiple bottles without much downtime between each bottle, the apparatus must take into consideration how hot the heater is from its previous run. If the heater is still very hot, the apparatus would heat the water more than needed and the resulting bottle will be too hot. Therefore, the apparatus calculates how much hotter the heater is than the ambient temperature and reduces the preheat time by the following equation that was derived by extensive testing:

Less time to Preheat=(Heater Surface−Ambient Temperature)sec/4.275

Step 4e: Apparatus makes adjustment to target temperature to account for post-heater elements. Lastly the apparatus must make adjustments for when the system has cooled down. To account for the system cooling, another adjustment must be made to increase the target temperature that the system shoots for. After extensive testing, power and logarithmic regressions were made to make the following look-up table that relate volume and user desired temperature input to increase in target temperature. In short, Table 2 (as depicted in FIG. 20) shows how much to increase the target temperature that goes into look-up Table 1. Indirectly this increases the pre-heat time. The increase in target temperature look-up table was calculated by the average of the following equations:

$$\text{Increase Target Temp}_{logarithmic}(\Delta) = a \times \ln(\Delta) + b - \Delta$$

$$\text{Increase Target Temp}_{power}(\Delta) = c \times (\Delta)^d - \Delta$$

-continued

Increase Target Temp(Δ) =

Increase Target Temp$_{logarithmic}$(Δ) + Increase Target Temp$_{power}$(Δ)

where:
Δ=Desired−Ambient Temperature (F)
a=0.2455×Volume+6.2961
b=−1.6162×Volume+12.081
c=−0.9738×Volume+11.999
d=0.039×Volume+0.296

Step 4f: Apparatus calculates cooling factor for target temperature. To account for post-heater components cooling the following equations were made to adjust the temperature difference (Δ).

New Δ = New User Desired Temperature − System Sate

System State = Last Bottom Temp −

$$\frac{\text{Time Elaspsed} \times (\text{Last Bottle Temp} - \text{Ambient Temp})}{45 \text{ mins}}$$

If the apparatus is making its first bottle after being turned on, it will assume Last Bottle Temperature is equal to Ambient Temperature. Also time elapsed is capped out at predetermined period of time (e.g., 45 minutes).

Step 4g: Unit calculates how much to pump water and formula (liquid concentrate solution). The process for pumping and heating is the same for every bottle. The heater begins preheating, the water begins pumping, the liquid concentrate solution begins pumping, the liquid concentrate solution stops pumping, and finally the heater and water pump turn off together. The amount of time the water and formula pump is given by the following look-up equations and table:

$$\text{Water Pump Rate} = 0.4598 \frac{\text{oz}}{\text{seconds}}$$

$$\text{Formula Pump Rate} = 09655 \frac{\text{oz}}{\text{seconds}}$$

$$\text{Water Pump Time} = \frac{\text{Total Desired Volume}}{\text{Water Pump Rate}}$$

$$\text{Formula Pump time} = \frac{\text{Total Desired Volume}}{\text{Formula Pump Rate}}$$

The last column in Table 3 (depicted in FIG. 21) refers to how long the formula (i.e., liquid concentrate solution) waits to begin pumping after the water begins pumping so that the liquid concentrate solution cuts out 2 seconds (or any other predetermined amount of time) before the water cuts out. This is to help flush excess liquid concentrate solution out of the mixing chamber as well as rinse the duck-bill valve or dispenser tip.

Step 5: Apparatus begins preheating heater. If the value of pre-heat time is positive after the adjustments, the unit starts pre-heating the heater that amount. If the pre-heat time is greater than 32 seconds, for example, the apparatus sets the preheat time to 32 seconds in order to avoid boiling the water. The apparatus flashes an amber L.E.D. and displays a screen that reads "preparing to dispense."

Alternatively, if the pre-heat time is negative, the apparatus begins pumping the water and waits to heat the heater by the magnitude of the pre-heat time. If the magnitude of a negative pre-heat value is less than the water pump time calculated in Step 4e, the heater never turns on. Or in other aspects, a chiller can be included to actually cool the water if needed or desired.

Step 6: Apparatus dispenses water and liquid concentrate solution. As explained in step 4e, the water pumps first then the liquid concentrate solution follows. The liquid concentrate solution stops pumping (e.g., for 2 seconds) before the water cuts out.

Step 7: Bottle is ready to be consumed. Because the water does not come out at uniform temperature, the bottle may be hotter in some places than others, especially at the top. For testing and serving, the bottles contents should be swished for a few seconds to even the temperature throughout the bottle. Now, the bottle will be ready to be ingested at the right temperature.

It should be understood that the heating process as described above is provided as a specific example by which the apparatus can be implemented; however, the invention is not intended to be limited thereto as the specifics of the heating process can be altered as desired or needed. It should also be understood that the apparatus and its components can be modified as desired to provide a variety of additional features. For example, bar codes or other unique identifiers can be included on each concentrate solution vessel 200. The use of a bar code or other identifier (e.g., radio frequency identification (RFID) on the concentrate solution vessel 200 allows the apparatus to identify or inform (1) the size/volume of contents, or (2) date of manufacturing, or (3) shelf-life, or (4) viscosity of liquid concentrate, or (5) brand of liquid concentrate, or (6) track usage of a particular vessel for replenishment of container. In this aspect, the apparatus would have a reader that is operable for scanning or reading the bar code (or identifier) to inform the apparatus and/or user and provide the operable features listed above.

Additional features include the use of an integrated handle feature on the liquid concentrate baby formula container (e.g., pouch) or vessel 200 for hanging or holding or positioning or aligning on the item on a retail shelf or drawer. The handle feature can be, for example, a grommet that allows it to be easily hung on a retailer shelf. Further, a pin or other similar device can be positioned at the appropriate location in the dispensing apparatus (such as within a pouch holder area) so that a user can easily position the liquid concentrate pouch at the appropriate location inside the dispensing machine. For example and in various embodiments, instead of replacing the entire concentrate solution vessel 200 (which includes the rigid outer shell), a user would simply replace the concentrate solution pouch 204 which would have the gear pump 806 and concentrate dispenser 206 attached with the pouch 204. A grommet could optionally be formed in the pouch 204 to assist a user in aligning the pouch 204 with the apparatus.

Thus, it should be understood that in various embodiments, the pouch 204 is the primary container that contains the liquid concentrate. The pouch 204 can be rigid or, in other aspects, is desirably flexible as described above. Further, one or more valves and a gear pump 806 can be connected with the pouch 204 for controlling the process by which the liquid concentrate solution is dispensed from the pouch. The rigid shell can be optionally included to protect the pouch 204 from puncture 204 and/or contamination.

In another aspect, the pouch 204 can be formed such that it can be used without the use of dispensing apparatus 100 for traveling purposes by the opening of a sealed feature. As a non-limiting example, the liquid concentrate pouch 204 can include a tear away corner (similar to a ketchup packet) to allow a user to selectively squeeze the liquid concentrate from the container without the use of a dispensing apparatus 100.

In another aspect, a smart baby bottle can be included. For example, the baby bottle may include RFID or Near Field Communication, or any other suitable identifier to allow a user to personalize a particular bottle with a particular child. Other features as can be implemented using the identifier include personalizing identification of different bottle brands, automatic heating of water (or the heater) in the dispensing apparatus upon close proximity of a particular bottle when sensed by the machine, and dispensing mixed baby formula only when a bottle is under the dispensing nozzle.

In another aspect, a software application or user interface can be included that is connected directly with the dispensing apparatus and/or, wirelessly connected with the dispensing apparatus to provide a variety of functions and features as described herein, such as setting temperatures and volume preferences. In other aspects, the bottles can be tracked for feeding history. Other aspects include the ability to remotely start making a bottle, such as through the software application or a remote control, etc. Additional features that can be included in the software application and/or apparatus include tracking the volume in the apparatus, concentrate solution vessel, and/or a baby bottle. The recommended expiration time (i.e., safe-use time) for a particular concrete solution vessel or mixed baby bottle can also be tracked using the apparatus and/or software application.

The features described above are further illustrated in the figures submitted herewith. While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. An apparatus for preparing baby formula, comprising:
   a housing having a concentrate solution receptor for receiving and holding a container of liquid concentrate solution;
   a motor attached to the housing, the motor operable for forcing liquid concentrate solution from the container of liquid concentrate solution and into a mixing chamber;
   a pump and a water tank attached to the housing, the pump being in fluid connection with the water tank;
   a spray head with a plurality of spray jets for receiving water from the water tank and dispensing water from the spray jets into the mixing chamber, wherein the plurality of spray jets are formed to spray water downward and at an angle to create a vortex;
   a mixing chamber for receiving the liquid concentrate solution and water, such that when the water and the liquid concentrate solution are introduced into the mixing chamber, the water and liquid concentrate solution mix in a vortex into a baby formula and are dispensed from an outlet in the mixing chamber; and
   a pour centering pin connected to the outlet of the mixing chamber, the pour centering pin being a pin surrounded by four paddles.

2. The apparatus as set forth in claim 1, further comprising a spray head receptor affixed to the housing and in fluid connection with the pump, with the spray head being detachably attachable to the spray head receptor.

3. The apparatus as set forth in claim 2, wherein when the spray head is attached to the spray head receptor, a gap is formed between the spray head and the spray head receptor, such that when the spray head receptor receives water, the water is introduced into the gap and forced from the spray jets in the spray head and into the mixing chamber.

4. The apparatus as set forth in claim 1, wherein the spray head includes a plurality of protrusions and wherein the mixing chamber includes a circumference with a cam-shaped ridge that passes around the circumference of the mixing chamber, such that when the mixing chamber is attached to the spray head, twisting the mixing chamber causes the cam-shaped ridge to engage with the plurality protrusions and push the mixing chamber away from the spray head.

5. The apparatus as set forth in claim 4, wherein the spray head includes at least one magnet therein and the mixing chamber includes a top portion framed by a metal ring, such that a magnetic connection between the metal ring and at least one magnet allows for selective attachment of the mixing chamber with the spray head, and wherein twisting the mixing chamber causes the cam-shaped ridge to engage with the plurality protrusions and push the mixing chamber away from the spray head and, in doing so, break the magnetic connection between the metal ring and at least one magnet.

6. The apparatus as set forth in claim 1, wherein when a container of liquid concentrate solution is attached to the concentrate solution receptor, the motor engages with a gear pump to pump liquid concentrate solution from the container of liquid concentrate solution.

7. The apparatus as set forth in claim 1, wherein when a container of liquid concentrate solution is attached to the concentrate solution receptor, a concentrate dispenser projecting from the container of liquid concentrate solution passes through the spray head and into the mixing chamber, and further comprising a cleansing spray jet formed in the spray head, such that when the concentrate dispenser passes through the spray head, water received from the water tank is directed from the cleansing spray jet onto the concentrate dispenser to clean the concentrate dispenser.

8. The apparatus as set forth in claim 1, further comprising at least one mesh strainer connected to the outlet of the mixing chamber.

9. The apparatus as set forth in claim 1, further comprising:
   a heater for heating the water;
   a first temperature sensor positioned for sensing water temperature within the water tank;
   a second temperature sensor positioned for sensing temperature of the heater; and
   a third temperature sensor positioned for sensing at least one of ambient air temperature and temperature of the liquid concentrate solution.

10. The apparatus as set forth in claim 9, further comprising an input control adapted to allow a user to select a desired volume and baby formula temperature, such that upon receiving the desired volume and baby formula temperature, the apparatus activates the heater for a period of time based on the water temperature within the tank, the temperature of the heater, and the temperature of at least one of ambient air temperature and temperature of the liquid concentrate solution.

11. The apparatus as set forth in claim 1, further comprising a container of liquid concentrate solution, wherein the container of liquid concentrate solution is a flexible pouch having a pouch portion for holding the liquid concentrate solution therein.

12. The apparatus as set forth in claim 11, further comprising a gear pump in fluid connection with the pouch portion and a duck-bill valve in fluid connection with the gear pump, with the duck-bill valve operable as a concentrate dispenser for dispensing liquid concentrate solution from the flexible pouch.

13. The apparatus as set forth in claim 12, further comprising one-way valve in fluid communication with the gear pump and duck-bill valve, such that the one-way valve is downstream from the gear pump and upstream from the duck-bill valve.

14. The apparatus as set forth in claim 13, wherein the flexible pouch is sealed within a rigid shell, with the rigid shell and flexible pouch collectively forming a liquid concentrate solution vessel.

15. The apparatus as set forth in claim 14, further comprising a handle attached to the concentrate solution vessel, the handle being connected to the concentrate dispenser such that pulling the handle away from the concentrate solution vessel and twisting the handle opens a locked valve within the concentrate solution vessel and pivots the concentrate dispenser downward into a dispensing position.

16. An apparatus for preparing baby formula, comprising:
a housing having a concentrate solution receptor for receiving and holding a container of liquid concentrate solution;
a motor attached to the housing, the motor operable for forcing liquid concentrate solution from the container of liquid concentrate solution and into a mixing chamber;
a pump and a water tank attached to the housing, the pump being in fluid connection with the water tank;
a spray head with a plurality of spray jets for receiving water from the water tank and dispensing water from the spray jets into the mixing chamber, wherein the plurality of spray jets are formed to spray water downward and at an angle to create a vortex; and
a mixing chamber for receiving the liquid concentrate solution and water, such that when the water and the liquid concentrate solution are introduced into the mixing chamber, the water and liquid concentrate solution mix in a vortex into a baby formula and are dispensed from an outlet in the mixing chamber;
a spray head receptor affixed to the housing and in fluid connection with the pump, with the spray head being detachably attachable to the spray head receptor;
wherein when the spray head is attached to the spray head receptor, a gap is formed between the spray head and the spray head receptor, such that when the spray head receptor receives water, the water is introduced into the gap and forced from the spray jets in the spray head and into the mixing chamber;
wherein the spray head includes a hole formed therethrough, with a twist cam lock passing through the hole, and wherein the spray head receptor includes a lock hole with cam channels formed therein, such that a user can selectively attach and detach the spray head from the spray head receptor using the twist cam lock;
wherein the mixing chamber is detachably attachable to the spray head;
wherein the spray head includes a plurality of protrusions and wherein the mixing chamber includes a circumference with a cam-shaped ridge that passes around the circumference of the mixing chamber, such that when the mixing chamber is attached to the spray head, twisting the mixing chamber causes the cam-shaped ridge to engage with the plurality protrusions and push the mixing chamber away from the spray head;
wherein the spray head includes at least one magnet therein and the mixing chamber includes a top portion framed by a metal ring, such that a magnetic connection between the metal ring and at least one magnet allows for selective attachment of the mixing chamber with the spray head, and wherein twisting the mixing chamber causes the cam-shaped ridge to engage with the plurality protrusions and push the mixing chamber away from the spray head and, in doing so, break the magnetic connection between the metal ring and at least one magnet;
wherein when a container of liquid concentrate solution is attached to the concentrate solution receptor, the motor engages with a gear pump to pump liquid concentrate solution from the container of liquid concentrate solution;
wherein when a container of liquid concentrate solution is attached to the concentrate solution receptor, a concentrate dispenser projecting from the container of liquid concentrate solution passes through the spray head and into the mixing chamber, and further comprising a cleansing spray jet formed in the spray head, such that when the concentrate dispenser passes through the spray head, water received from the water tank is directed from the cleansing spray jet onto the concentrate dispenser to clean the concentrate dispenser;
further comprising a pour centering pin connected to the outlet of the mixing chamber;
further comprising at least one mesh strainer connected to the outlet of the mixing chamber;
further comprising:
a heater for heating the water;
a first temperature sensor positioned for sensing water temperature within the water tank;
a second temperature sensor positioned for sensing temperature of the heater; and
a third temperature sensor positioned for sensing at least one of ambient air temperature and temperature of the liquid concentrate solution;
further comprising an input control adapted to allow a user to select a desired volume and baby formula temperature, such that upon receiving the desired volume and baby formula temperature, the apparatus activates the heater for a period of time to obtain the desired volume and baby formula temperature based on the water temperature within the tank, the temperature of the heater, and the temperature of at least one of ambient air temperature and temperature of the liquid concentrate solution;
further comprising a container of liquid concentrate solution, wherein the container of liquid concentrate solution is a flexible pouch having a pouch portion for holding the liquid concentrate solution therein;
further comprising a gear pump in fluid connection with the pouch portion and a duck-bill valve in fluid connection with the gear pump, with the duck-bill valve operable as a concentrate dispenser for dispensing liquid concentrate solution from the flexible pouch;
further comprising one-way valve in fluid communication with the gear pump and duck-bill valve, such that the one-way valve is downstream from the gear pump and upstream from the duck-bill valve;

wherein the flexible pouch is sealed within a rigid shell, with the rigid shell and flexible pouch collectively forming a liquid concentrate solution vessel; and further comprising a handle attached to the concentrate solution vessel, the handle being connected to the concentrate dispenser such that pulling the handle away from the concentrate solution vessel and twisting the handle opens a locked valve within the concentrate solution vessel and pivots the concentrate dispenser downward into a dispensing position.

* * * * *